US008227178B2

(12) United States Patent
Sakuma et al.

(10) Patent No.: US 8,227,178 B2
(45) Date of Patent: Jul. 24, 2012

(54) MANUFACTURING METHOD OF PLANAR OPTICAL WAVEGUIDE DEVICE WITH GRATING STRUCTURE

(75) Inventors: Ken Sakuma, Sakura (JP); Kensuke Ogawa, Sakura (JP); Kazuhiro Goi, Sakura (JP); Yong Tsong Tan, Sakura (JP); Ning Guan, Sakura (JP); Mingbin Yu, Singapore (SG); Hwee Gee Teo, Singapore (SG); Guo-Qiang Lo, Singapore (SG)

(73) Assignees: Fujikura Ltd., Tokyo (JP); Agency for Science, Technology and Research, Singapore (SG)

( * ) Notice: Subject to any disclaimer, the term of this patent is extended or adjusted under 35 U.S.C. 154(b) by 511 days.

(21) Appl. No.: 12/547,146

(22) Filed: Aug. 25, 2009

(65) Prior Publication Data

US 2011/0053095 A1    Mar. 3, 2011

(51) Int. Cl.
*G03F 7/20* (2006.01)
(52) U.S. Cl. ................ 430/321; 430/394; 216/24
(58) Field of Classification Search ............ None
See application file for complete search history.

(56) References Cited

U.S. PATENT DOCUMENTS

| 6,707,967 | B2 | 3/2004 | Rothenberg et al. | |
| 2003/0228120 | A1* | 12/2003 | Kuramoto et al. | 385/132 |
| 2005/0164131 | A1* | 7/2005 | Yokouchi | 430/321 |
| 2005/0213917 | A1* | 9/2005 | Fukuda et al. | 385/132 |
| 2007/0248134 | A1* | 10/2007 | Hatori et al. | 372/45.01 |

FOREIGN PATENT DOCUMENTS

| JP | 55-115002 A | 9/1980 |
| JP | 9-325227 A | 12/1997 |
| JP | 2000-235125 A | 8/2000 |
| JP | 2004-077665 A | 3/2004 |
| JP | 2005-316019 A | 11/2005 |

OTHER PUBLICATIONS

Hongpu Li, et al., "Phased-Only Sampled Fiber Bragg Gratings for High-Channel-Count Chromatic Dispersion Compensation", Journal of Lightwave Technology, Sep. 2003, pp. 2074-2083, vol. 21, No. 9.
Marc D. Levenson, et al., "Improving Resolution in Photolithography with a Phase-Shifting Mask", IEEE Transactions on Electron Devices, Dec. 1982, pp. 1828-1836, vol. ED-29, No. 12.

(Continued)

*Primary Examiner* — John A. McPherson
(74) *Attorney, Agent, or Firm* — Sughrue Mion, PLLC

(57) ABSTRACT

A method for manufacturing a planar optical waveguide device including a core of which a top face is provided with a groove section filled with a groove section filler made of a low refractive index material having a refractive index lower than that of the core, the method including; a first high refractive index material layer forming step of forming a high refractive index material layer; a low refractive index material layer forming step of forming a low refractive index material layer made of the low refractive index material on the high refractive index material layer; a groove section filler forming step of forming the groove section filler by trimming both lateral portions of the low refractive index material layer; and a second high refractive index material layer forming step of forming a high refractive index material layer so as to fill the both sides of the lateral portions of the groove section filler.

10 Claims, 30 Drawing Sheets

OTHER PUBLICATIONS

Thierry Pinguet, et al., "A 1550 nm, 10 Gbps optical modulator with integrated driver in 130 nm CMOS", 2007 4th IEEE International Conference on Group IV Photonics, pp. 186-188.

J.E. Sipe, et al., "Propagation through nonuniform grating structures", Journal of the Optical Society of America A, Apr. 1994, pp. 1307-1320, vol. 11, Issue 4.

Panayiotis V. Frangos, et al., "A numerical solution to the Zakharov-Shabat inverse scattering problem", IEEE Transactions on Antennas and Propagation, Jan. 1991, pp. 74-79, vol. 39, Issue 1.

Gaobiao Xiao, et al., "An Efficient Algorithm for Solving Zakharov-Shabat Inverse Scattering Problem", IEEE Transaction on Antennas and Propagation, Jun. 2002, pp. 807-811, vol. 50, Issue 6.

Ghie-Hugh Song, et al., "Design of corrugated waveguide filters by the Gel'fand-Levitan-Marchenko inverse-scattering method", Journal of Optical Society of America A, Nov. 1985, pp. 1905-1915, vol. 2, Issue 11.

Ricardo Feced, et al., "An Efficient Inverse Scattering Algorithm for the Design of Nonuniform Fiber Bragg Gratings", IEEE Journal of Quantum Electronics, Aug. 1999, pp. 1105-1115, vol. 35, Issue 8.

* cited by examiner

MANUFACTURING METHOD OF PLANAR OPTICAL WAVEGUIDE DEVICE WITH GRATING STRUCTURE

TECHNICAL FIELD

The present invention relates to a manufacturing method of a planar optical waveguide device with a grating structure.

BACKGROUND ART

In recent years, the amount of information transmitted through the optical fiber communication network has rapidly increased due to the progress in the optical fiber communication system, especially due to the invention of the erbium-doped fiber amplifier (EDFA) and the dense wavelength division multiplexing (DWDM) system. In order to meet the demand for increased data capacity, research and development to increase the number of wavelengths to be multiplexed is being carried out on a modulation method in which the frequency efficiency is high. In the DWDM system, there is a need for an optical component having a more advanced function, such as a chromatic dispersion compensator which compensates the wavelength dispersion and the dispersion slope of each channel more precisely than the dispersion compensation optical fiber module used in the related art. In addition, research and development is also being carried out on a variable chromatic dispersion compensator, which is capable of meeting a rerouting or a temporal and periodical change of the dispersion characteristic of the optical transmission line, and a polarization mode dispersion compensator, which compensates the polarization mode dispersion dynamically.

On the other hand, as the sizes of information communication systems and the number of information communication systems installed increase rapidly, the large amount of power consumed by a computer system or a high-end router becomes a problem from the points of view of not only economic efficiency but also environmental impact. For this reason, green ICT (Information and Communication Technology) for reducing the power and environmental impact is required. If various transmission apparatuses, such as a router, can be made smaller, the apparatus accommodation efficiency in the data center or the central office of a telecommunication carrier will be improved. As a result, the space use efficiency is improved. In addition, it becomes possible to greatly reduce the power consumed by the air conditioner of the data center or the central office, which contributes to energy saving. Accordingly, there is also a demand for power reduction and miniaturization of optical components used in various optical transmission devices.

As a technology for manufacturing small and highly functional optical components, a silicon photonics technology of manufacturing an optical waveguide device by using a CMOS manufacturing process has come into the spotlight, and research and development on this are being carried out. By forming the optical waveguide using a high refractive index material, such as silicon (Si) or silicon nitride (SiN), it becomes possible to miniaturize the conventional optical waveguide device which uses the known various silica ($SiO_2$)-based glasses as the main constituent material of the core and cladding. In addition, since a semiconductor material obtained by doping an impurity dopant into Si is used, it becomes possible to adjust the refractive index by applying the voltage from the outside. As a result, a device with a variable optical characteristic can be realized. Moreover, since it is a manufacturing process suitable for mass production, it is expected that the price of the optical component will drop in the future.

As a known planar optical waveguide device having a Bragg grating pattern, a uniform-pitch grating structure shown in FIG. 47 is known, in which the pitch $P_G$ of a fin 201 and a valley 202 provided on a sidewall of an optical waveguide 200 is constant. Moreover, as shown in FIG. 48, the chirped-pitch grating structure is known, in which the pitch of a fin 301 and a valley 302 provided on a sidewall of an optical waveguide 300 gradually varies like $P_G{}^i > P_G{}^j > P_G{}^k > P_G{}^l > P_G{}^m > P_G{}^n$ is known.

Patent Document 1 discloses a wavelength dispersion compensation device in which Bragg gratings having one certain period are formed in the optical waveguide, such as an optical fiber or a waveguide formed on a substrate (planar optical waveguide), and the sampling structure is formed in the optical waveguide so as to overlap the Bragg gratings and which performs wavelength dispersion compensation in a plurality of wavelength channels. The sampling structure is formed by a phase sampling pattern with one certain period which is longer than the period of the Bragg gratings. Each period of the phase sampling is divided into a plurality of space regions in the direction along the optical axis of the optical waveguide, and the phase of the Bragg gratings changes discontinuously on the boundary where the adjacent space regions are in contact with each other. As shown in FIGS. 1A to 1D of Patent Document 1, there is no discontinuous change of the phase in one space region.

In addition, Non-patent Document 1 is a scientific paper written by the inventors of Patent Document 1 and discloses technical information which complements Patent Document 1. First, the Bragg grating pattern of a single channel at the center wavelength is designed by using the knowledge of Patent Document 1. The grating pattern is derived from the spectral characteristic of desired reflection and wavelength dispersion by using the inverse scattering method. However, in the Fiber Bragg Grating, there is a limitation on the range where the refractive index can be changed to form the grating pattern. For this reason, an operation of performing the inverse Fourier transform of the spectral characteristic and apodizing it so that the limitation is not exceeded is added. Thus, the pitch of the Bragg gratings in the pattern obtained changes continuously with the position. Then, the Bragg grating patterns of a plurality of channels are designed by phase sampling. In the Fiber Bragg Grating, the phase sampling is effective because there is a limitation on the variation range of the refractive index.

Patent Document 2 discloses a technique for realizing a device such as a chromatic dispersion compensator, which has a complicated optical characteristic, by solving the inverse scattering problem to design and manufacture the planar optical waveguide device.

The resolution of the photolithography process in each technology node of the CMOS device manufacturing technology is not necessarily determined only by making shorter the wavelength of light of the light source of the exposure apparatus, but is also improved by introducing Resolution Enhancement Techniques (RET), such as the phase shift mask (PSM). In the technology node of 400 nm or more, the light source which emits i-line beam with a wavelength of 365 nm was used. In each technology node of 250 nm, 180 nm, and 130 nm, the KrF excimer laser with a wavelength of 248 nm was used. Currently, the ArF excimer laser with a wavelength of 193 nm is introduced, and the immersion exposure technique has been developed. These developments therefore enabled technology nodes of 90 nm, 65 nm, and 45 nm to be practically used.

The phase shift method is known in the related art as a method of improving the resolution limit in the reduction projection exposure method in which the scanner (stepper) is used. According to Non-patent Document 2, the resolution limit in the phase shift method is improved about twice in comparison with the exposure method in which a usual transmission mask is used.

By now, not only a modulator or a light emitting/receiving element but also various optical passive devices, such as a photonic crystal waveguide, a silicon wire waveguide, and an AWG have been studied using silicon photonics technology as the optical components for optical fiber communication systems. Although an active cable module using a silicon photonics transceiver module has already been commercialized, the study of the silicon photonics technology is still in its infancy. A lot of studies up to now have been done by using a direct write process using an electron beam (EB) apparatus. Accordingly, knowledge on the photolithography process using a photomask has not been sufficiently accumulated yet. In manufacturing a silica glass based planar optical waveguide of an early date with a relative refractive index difference (usually called Δ) of about 0.3%, a one to one photomask was able to be used since the core width of the optical waveguide was as large as 7 μm. In contrast, in the high relative refractive index difference optical waveguide manufactured by using the silicon photonics technology, the effective refractive index for the signal light is increased. Accordingly, the core size of the single-mode optical waveguide is reduced to one-severalth, or to one several tenth thereof and the specific distance of the periodical structures of the photonic crystal waveguide or grating optical waveguide also becomes very small. For this reason, a finer process technology is required.

On the other hand, in the optical waveguide device, sufficient thickness or depth is required to realize the thickness of the core of the optical waveguide or to form the surrounding structure, such as cladding, unlike the LSI in which electronic circuit devices, such as a DRAM and a CPU, are integrated. For this reason, when the surrounding structures are formed, a case often occurs where the latest fine process cannot necessarily be applied and the old technology node, such as thick-film resist application, needs to be used. Moreover, in the cases of optical components for optical fiber communication systems which have less volume demand than more established ICs such as the DRAMs, CPUs, and the like: using the industrial 12-inch wafer fabrication line processes for mass production does not necessarily lead to cost reduction. Rather, in order to reduce the cost, it helps to manufacture an appropriate number of optical components by the old process using 6-inch wafers or 8-inch wafers in many cases. For example, the silicon photonics optical waveguide device for optical fiber communication systems manufactured using the 130 nm technology node is disclosed in Non-patent Document 3. The 130 nm technology node is the process in which the scanner (stepper) that uses a wavelength of 248 nm, for example, is used and the phase shift mask is used to improve the resolution.

Citation List

[Patent Literature]

[PTL 1] U.S. Pat. No. 6,707,967

[PTL 2] Japanese Unexamined Patent Application, First Publication No. 2004-077665

[Non Patent Literature]

[NPL 1] H. Li, Y. Sheng, Y. Li, and J.E. Rothenberg, "Phased-Only Sampled Fiber Bragg Gratings for High-Channel-Count Chromatic Dispersion Compensation", Journal of Lightwave Technology, Vol. 21, No. 9, pp. 2074-2083 (2003)

[NPL 2] Marc D. Levenson, N.S. Viswanathan, Robert A. Simpson, "Improving Resolution in Photolithography with a Phase-Shifting Mask", IEEE Transactions on Electron Dedices, Vol. ED-29, No. 12, pp. 1828-1836 (DECEMBER 1982)

[NPL 3] T. Pinguet, V. Sadagopan, A. Melds, B. Analui, D. Kucharski, S. Gloeckner, "A 1550 nm, 10 Gbps optical modulator with integrated driver in 130 nm CMOS", 2007 4th IEEE International Conference on Group IV Photonics, (19-21 Sep. 2007)

SUMMARY OF INVENTION

Technical Problem

In the known uniform-pitch grating structure or chirped-pitch grating structure, it is not possible to provide the high functionality—such as the optical dispersion compensation characteristic of compensating the wavelength dispersion and the dispersion slope of a plurality of channels simultaneously—as the optical characteristic of the planar optical waveguide device. Moreover, when manufacturing the device using the silicon photonics technology, it is not easy to control the processing accuracy of each structural dimension where the size changes gradually like for the chirped-pitch grating structure. Accordingly, there is a demand for a structure for which the process control is easier.

In the grating structure based on the phase sampling pattern disclosed in Patent Document 1 or Non-patent Document 1, the multi-channel chromatic dispersion compensator may also be realized in an optical waveguide in which the amplitude of effective refractive indices is relatively small like the Fiber Bragg Grating (FBG). However, the length of the optical waveguide is increased as much as the increased functionality, by arraying the portions with high refractive indices along the optical axis of the optical waveguide according to the predetermined rule. Accordingly, this is not suitable for the purpose of making a highly functional device smaller by reducing the length of the highly functional device.

In order to realize an optical waveguide device having a high functionality, such as a chromatic dispersion compensator, it is suitable to design the grating optical waveguide based on the change of the core width of the optical waveguide by using the inverse scattering method as disclosed in Patent Document 2 and to realize the planar optical waveguide device by using the silicon photonics technology on the basis of the design. In Patent Document 2, however, when the change of the width of the core is very small, it is suggested that there is a possibility that a special process, such as the LIGA process in which X-ray lithography is used, will be required.

Therefore, it is an object of the present invention to provide a manufacturing method for a planar optical waveguide device which can be made smaller by reducing the length while realizing a high functionality and which has a grating structure in which the processing accuracy can be easily controlled in the manufacturing process.

Solution to Problem

In order to solve the above-described problems and achieve the above-described object, the present invention employs the following. That is, an aspect of the present invention is a method for manufacturing a planar optical waveguide device including a core of which a top face is provided with a groove section along a longitudinal direction of the core, the groove section being filled with a groove section filler made of a low refractive index material having a refractive index lower than a refractive index of the core, the method including; a first high refractive index material layer forming step of forming a high refractive index material layer made of a high refractive index material which constitutes a lower part of the core; a low refractive index material layer forming step of forming a low refractive index material layer made of the low refractive index material on the high refractive index material layer; a groove section filler forming step of forming the groove section filler by trimming both lateral portions of the low refractive index material layer by means of photolithography and etching; and a second high refractive index material layer forming step of forming a high refractive index material layer made of a high refractive index material which constitutes an upper part of the core so as to fill both sides of the lateral portions of the groove section filler.

In addition, another aspect of the present invention is a method for manufacturing a planar optical waveguide device including a core of which a bottom face is provided with a groove section along a longitudinal direction of the core, the groove section being filled with a groove section filler made of a low refractive index material having a refractive index lower than a refractive index of the core, the method including; a low refractive index material layer forming step of forming a low refractive index material layer made of a low refractive index material; a groove section filler forming step of forming the groove section filler by trimming both lateral portions of the low refractive index material layer by means of photolithography and etching; and a high refractive index material layer forming step of forming a high refractive index material layer made of a high refractive index material which constitutes the core so as to fill both sides of the lateral portions of the groove section filler and cover a top face of the groove section filler.

It may be arranged such that the groove section includes a plurality of alternatively arranged fin portions and valley portions along a longitudinal direction of the core to form a grating structure, in which the shapes of the material which constitute the core are a fin shape and the lateral widths of the groove section filler are narrow at respective fin portions and the shapes of the material which constitute the core are a valley shape and the lateral widths of the groove section filler are wide at respective valley portions.

It may be arranged such that the lateral widths of the groove section filler at the fin portions and the lateral widths of the groove section filler at the valley portions vary.

It may be arranged such that pitches, which are each defined as a sum of a longitudinal length of one of the fin portions and a longitudinal length of one of the valley portions adjacent to said one of the fin portions along a longitudinal direction of the core, vary and are non-chirped.

It may be arranged such that each of the pitches ($P_G$) over the entirety of the grating structure satisfies ($P_G$–P)/$\Delta$P=N, where P is a predetermined reference value of the pitches, $\Delta$P is P divided by M, M is an integer greater than one, and N is an integer.

It may be arranged such that the N for major pitches of the grating structure are +1, –1, or 0.

It may be arranged such that lateral widths of the groove section filler of the fin portions, lateral width of the groove section filler of the valley portions and pitches, which are each defined as a sum of a longitudinal length of one of the fin portions and a longitudinal length of one of the valley portions adjacent to said one of the fin portions along a longitudinal direction of the core, are set to values obtained by solving the inverse scattering problem to which predetermined optical characteristics are input.

It may be arranged such that the inverse scattering problem is solved using Zakharov-Shabat's equation.

It may be arranged such that the groove section filler forming step further includes: a photoresist layer forming step of forming a photoresist layer on said low refractive index material layer, a first exposure step of forming shaded portions on the photoresist layer using a first photomask, the first photomask being a phase-shifting photomask and the lateral widths of the shaded portion at positions corresponding to the fin portions are substantially equal to the respective widths of the groove section filler of the fin portions and lateral widths at positions corresponding to the valley portions are wider than the respective lateral widths of the groove section filler of the valley portions and exposing the photoresist layer at the outside of the shaded portions; a second exposure step of forming shaded portions on the photoresist layer using a second photomask, the second photomask being a binary photomask and the lateral widths of the shaded portions at positions corresponding to the fin portions are wider than the respective lateral widths of the groove section filler of the fin portions and the lateral widths of the shaded portions at positions corresponding to the valley portions are substantially equal to the respective lateral widths of the groove section filler of the valley portions; a development step of developing the photoresist layer; and an etching step of etching the low refractive index material layer using the photoresist pattern resulted from the development step to form the groove section filler.

Advantageous Effects of Invention

According to the above-described manufacturing method of the planar optical waveguide device, the polarization independent waveguide structure can be realized by forming a groove in the upper or lower portion of the core. In addition, the groove can be easily and precisely formed in the core by the step of filling both the sides after forming the groove section filler.

Compared with the known chirped grating in which the pitch changes gradually, the length can be reduced for miniaturization while realizing high functionality and the processing accuracy can be easily controlled in the manufacturing process.

Since the grating optical waveguide is designed by solving the inverse scattering problem using the Zakharov-Shabat equations, the planar optical waveguide device having an optical characteristic of a complicated function, such as the chromatic dispersion compensator which compensates the group delay dispersion and the dispersion slope of optical fiber transmission lines simultaneously over a number of DWDM channels, can be made small with a short waveguide length.

Since the planar optical waveguide device can be manufactured by the silicon photonics technology in which the CMOS manufacturing process is used, mass production becomes possible. As a result, the price of the device can be reduced. In addition, the device can be made small by adopting the high relative refractive index difference optical waveguide structure.

As a result of having designed the grating optical waveguide by solving the inverse scattering problem using the Zakharov-Shabat equations, the pitch in the grating optical waveguide takes a plurality of certain discrete values and the core width of the optical waveguide and the lateral width of the grooved structure are not uniform. Since the grating pitch takes a plurality of certain discrete values, process control becomes easier unlike with the chirped type.

When the grating structure is formed, the first exposure step of forming shaded portions on the photoresist layer using the phase-shifting photomask and the lateral width of the shaded portions at positions corresponding to the fin portions are extended and wider than the designed values of respective core widths of the fin portions and exposing the photoresist layer at the outside of said shaded portions, and the second exposure step of forming shaded portions on the photoresist layer using the binary-type photomask and the lateral widths of the shaded portions at positions corresponding to the fin portions are substantially equal to the designed values of respective core widths of the fin portions, are adopted. Accordingly, even if the old exposure apparatus which uses light with a wavelength of 248 nm is used, a grating optical waveguide having a complicated shape can be manufactured as designed.

BRIEF DESCRIPTION OF DRAWINGS

FIG. 1A is a partial perspective view illustrating a core portion of a planar optical waveguide device according to a first embodiment of the present invention.
FIG. 1B is a partial top view illustrating the core portion according to a first embodiment of the present invention.
FIG. 1C is a cross-sectional view illustrating the planar optical waveguide device according to a first embodiment of the present invention.
FIG. 2 is a partial top view of the core portion for explaining $w_{in}$ and $w_{out}$ in the first embodiment.
FIG. 3 is an explanatory view illustrating an example of the form in which a planar optical waveguide device and an optical transmission line are connected to each other.
FIG. 4A is a graph illustrating an example of the change of $n_{eff}$ to $w_{in}$ in the first embodiment.
FIG. 4B is a graph illustrating an example of the change of $w_{out}$ to the change of $w_{in}$ in the first embodiment.
FIG. 5 is a graph illustrating the change of $w_{in}$ and $w_{out}$ to $n_{eff}$ in the first embodiment.
FIG. 6 is a graph illustrating an example of the reflection spectrum.
FIG. 7 is a graph illustrating a part of FIG. 6 in an enlarged manner.
FIG. 8 is a graph illustrating an example of the group delay spectrum.
FIG. 9 is a graph illustrating a part of FIG. 8 in an enlarged manner.
FIG. 10 is a graph illustrating an example of the potential distribution.
FIG. 11 is a graph illustrating a part of FIG. 10 in an enlarged manner.
FIG. 12 is a partial perspective view illustrating the manufacturing process of the first embodiment.
FIG. 13 is a partial perspective view illustrating the manufacturing process of the first embodiment.
FIG. 14A is a partial perspective view illustrating the manufacturing process of the first embodiment.
FIG. 14B is a partial perspective view illustrating the manufacturing process of the first embodiment.
FIG. 15 is a partial perspective view illustrating the manufacturing process of the first embodiment.
FIG. 16 is a partial perspective view illustrating the manufacturing process of the first embodiment.
FIG. 17 is a plan view illustrating a part of the chromium pattern of the phase-shifting photomask for the sidewall grating structure.
FIG. 18 is a plan view illustrating a part of the pi phase-shifting pattern of the phase-shifting photomask for the sidewall grating structure.
FIG. 19 is a plan view illustrating a part of the zero phase-shifting pattern of the phase-shifting photomask for the sidewall grating structure.
FIG. 20 is a plan view illustrating a part of the configuration of the phase-shifting photomask for the sidewall grating structure.
FIG. 21 is a plan view illustrating a part of the reverse pattern of the binary-type photomask for the sidewall grating structure.
FIG. 22 is a plan view illustrating a part of the photoresist pattern for the sidewall grating structure.
FIG. 23 is a plan view illustrating a part of the chromium pattern of the phase-shifting photomask for the upper or lower grating structure.
FIG. 24 is a plan view illustrating a part of the pi phase-shifting pattern of the phase-shifting photomask for the upper or lower grating structure.
FIG. 25 is a plan view illustrating a part of the zero phase-shifting pattern of the phase-shifting photomask for the upper or lower grating structure.
FIG. 26 is a plan view illustrating a part of the configuration of the phase-shifting photomask for the upper or lower grating structure.
FIG. 27A is a plan view illustrating a part of the reverse pattern of the binary-type photomask for the upper or lower grating structure.
FIG. 27B is a plan view illustrating the relationship between the core and the shaded portion caused by the binary-type photomask for the upper or lower grating structure.
FIG. 27C is a plan view illustrating the relationship between the core and the shaded portion caused by the binary-type photomask according to a first modified example.
FIG. 27D is a plan view illustrating the relationship between the core and the shaded portion caused by the binary-type photomask according to a second modified example.
FIG. 28 is a plan view illustrating a part of the photoresist pattern for the upper or lower grating structure.
FIG. 29 is a plan view illustrating a part of the pattern of the binary-type photomask for the upper grating structure in a first comparative example.

FIG. 30A is a plan view illustrating a part of the pattern of the phase-shifting photomask for the upper grating structure in a second and third comparative example.

FIG. 30B is a plan view illustrating a part of the pattern of the binary-type photomask for the upper grating structure in the third comparative example.

FIG. 31 is a partial perspective view illustrating the manufacturing process according to a second embodiment of the present invention.

FIG. 32 is a partial perspective view illustrating the manufacturing process of the second embodiment.

FIG. 33 is a partial perspective view illustrating the manufacturing process of the second embodiment.

FIG. 34 is a partial perspective view illustrating the manufacturing process of the second embodiment.

FIG. 35 is a partial perspective view illustrating the manufacturing process of the second embodiment.

FIG. 36 is a cross-sectional view illustrating a planar optical waveguide device according to a third embodiment of the present invention.

FIG. 37A is a graph illustrating an example of the change of $n_{eff}$ to $w_{in}$ in the third embodiment.

FIG. 37B is a graph illustrating an example of the change of $w_{out}$ to the change of $w_{in}$ in the third embodiment.

FIG. 38 is a graph illustrating an example of the change of $w_{in}$ and $w_{out}$ to $n_{eff}$ in the third embodiment.

FIG. 39 is a graph illustrating an example of the effective refractive index distribution in the third embodiment.

FIG. 40 is a graph illustrating a part of FIG. 39 in an enlarged manner.

FIG. 41 is a graph illustrating an example of the distribution of the grating pitch in the third embodiment.

FIG. 42 is a graph illustrating a part of FIG. 41 in an enlarged manner.

FIG. 43 is a scanning electron microscope (SEM) photograph obtained by photographing a part of the groove section filler formed in the second example from the upper side.

FIG. 44 is a scanning electron microscope (SEM) photograph in which a part of FIG. 43 is enlarged.

FIG. 45 is a scanning electron microscope (SEM) photograph obtained by photographing a part of the sidewall grating structure formed in the second example from the obliquely upper side.

FIG. 46 is a scanning electron microscope (SEM) photograph obtained by photographing a part of the sidewall grating structure formed in the second example from the upper side.

FIG. 47 is a top view illustrating an example of the known single-pitch grating structure.

FIG. 48 is a top view illustrating an example of the known chirped grating structure.

DESCRIPTION OF EMBODIMENTS

Figure 1A:
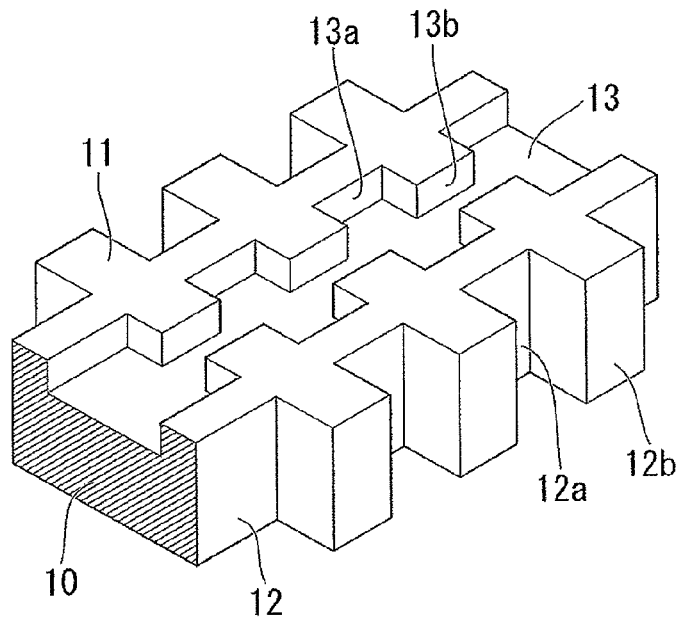
[FIG. 1A]

Hereinafter, the preferred embodiments of the present invention will be described with reference to the accompanying drawings. An optical waveguide device having a grating structure, which is configured to include valley and fin, on a sidewall of a grooved structure or an optical waveguide and a manufacturing method thereof according to the embodiments of the present invention are illustrated below. In addition, the present invention may also be applied to an optical waveguide device which does not have a grating structure on a sidewall of a grooved structure or an optical waveguide and to a manufacturing method thereof in the same manner.

Moreover, in the present invention, the polarization independent waveguide structure can be realized by forming a groove in an upper or lower portion of the core, filling the groove with a low refractive index material like the cladding, and appropriately setting the width and thickness of the groove.

In the related art, the technique of providing the stress reducing structure or the stress adjusting structure in the cladding surrounding the core or the technique of reducing the polarization dependence by study on the process of reducing the film stress of the whole cladding has been reported. Compared with such a technique, the technique of controlling the polarization dependence by forming a groove or a ridge in the upper or lower portion of the core to change the core shape itself is superior because suitable design according to the grating structure or the local structural change of the optical waveguide, such as a bent waveguide, becomes possible. In addition, when the case where a ridge is formed in the upper or lower portion of the core by using a high refractive index material like the core and the width and thickness of the ridge are appropriately set is compared with the case where a groove is formed in the upper or lower portion of the core described in this specification, the latter case where adjustment of the refractive index is performed in a region near the middle portion, in which the intensity distribution of propagation light which propagates through the optical waveguide is stronger, is excellent in controllability of the refractive index and it is easy to design a device.

In addition, it may also be considered to form a groove by direct processing of a high refractive index material layer like the case where a resist layer having an opening corresponding to the groove width is formed on a high refractive index material layer for forming the core and the high refractive index material layer is processed by photolithography and etching. However, there is a problem in that if the size of the optical waveguide is small, the groove which is formed to be dug by etching is also as small. In addition, when the observation is performed in a non-destructive way without observing the cut plane, there is a problem in that it is difficult to investigate the groove width or the groove depth. On the other hand, the manufacturing method according to the present invention includes: (A) first high refractive index layer forming step of forming a first high refractive index layer which forms a lower portion of the core; (B) low refractive index layer forming step of forming a low refractive index layer, which is formed of the low refractive index material, on the first high refractive index layer; (C) groove section filler forming step of forming the groove section filler by removing both side portions of the low refractive index layer by photolithography and etching; and (D) second high refractive index layer forming step of forming a second high refractive index layer, which forms an upper portion of the core, such that both the removed side portions are filled. Accordingly, it becomes easier to inspect the size of the groove by observing the groove section filler on the low refractive index material layer in the step of (C).

<First Embodiment of a Planar Optical Waveguide Device>

Figure 1B:
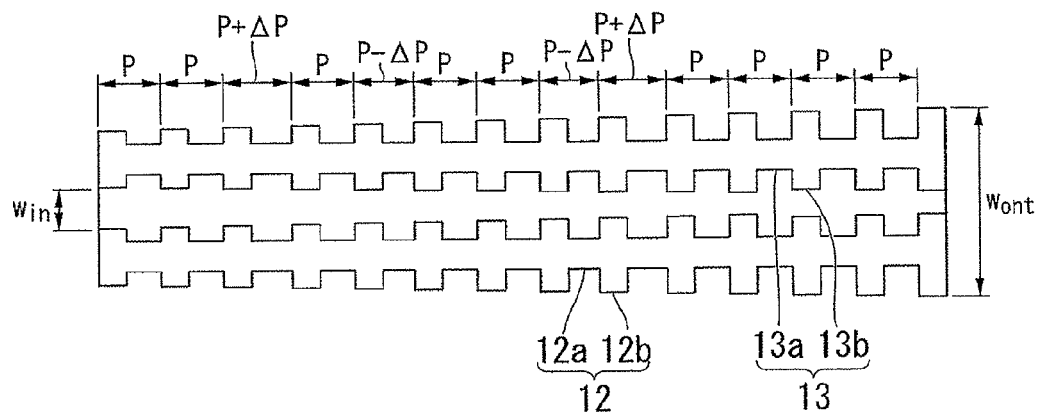
[FIG. 1B]
Figure 1C:
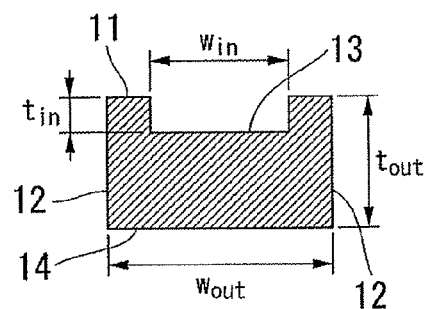
[FIG. 1C]
Figure 16:
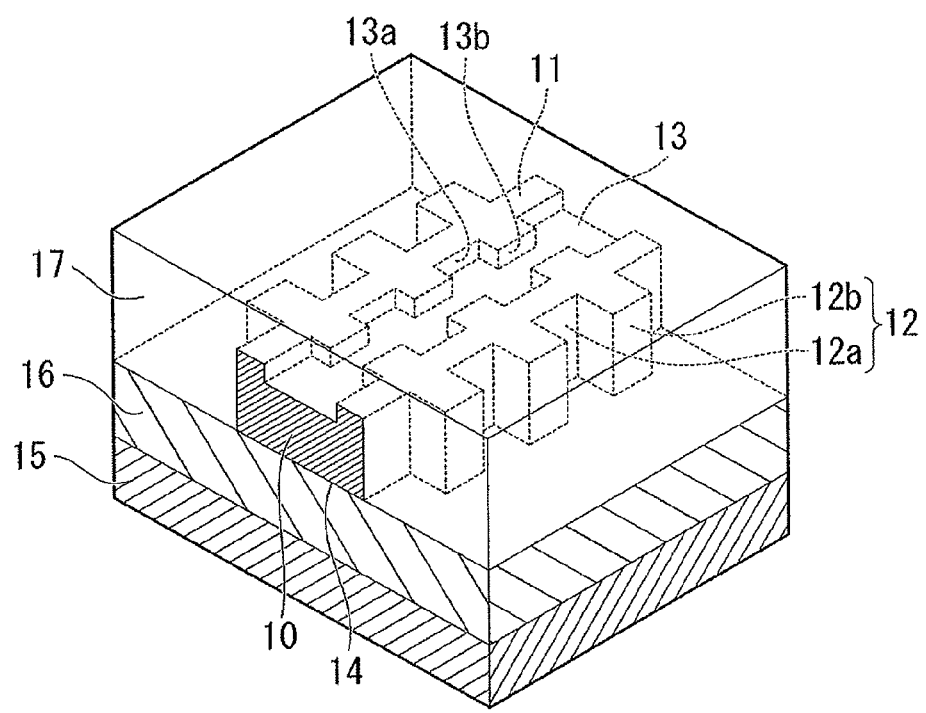
[FIG. 16]

A planar optical waveguide device according to a first embodiment of the present invention is schematically shown in FIGS. 1A to 1C. FIG. 1A is a perspective view illustrating a part of a core 10 of an optical waveguide, FIG. 1B is a top view illustrating the same part of the core 10, and FIG. 1C is a cross-sectional view illustrating the planar optical waveguide device. In addition, a perspective view of the planar optical waveguide device is shown in FIG. 16. In the meantime, in FIG. 1C, reference numerals 12 and 13 are used to denote a sidewall and a grooved structure of the core 10 without distinguishing valleys (valley portions) 12a and 13a and fins (fin portions) 12b and 13b of FIGS. 1A and 1B.

In this planar optical waveguide device the optical waveguide is formed on a substrate 15. The optical waveguide has a lower cladding 16 formed on the substrate 15, the core 10 formed on the lower cladding 16, and an upper cladding 17 formed on the core 10 and the lower cladding 16.

In addition, in order to solve the problem of polarization dependence of the optical characteristic, the grating structure 12 is provided on the sidewall of the core of the optical waveguide and the grooved grating structure 13 is provided on the upper portion of the core. A bottom surface 14 of the core 10 is flat.

Figure 2:
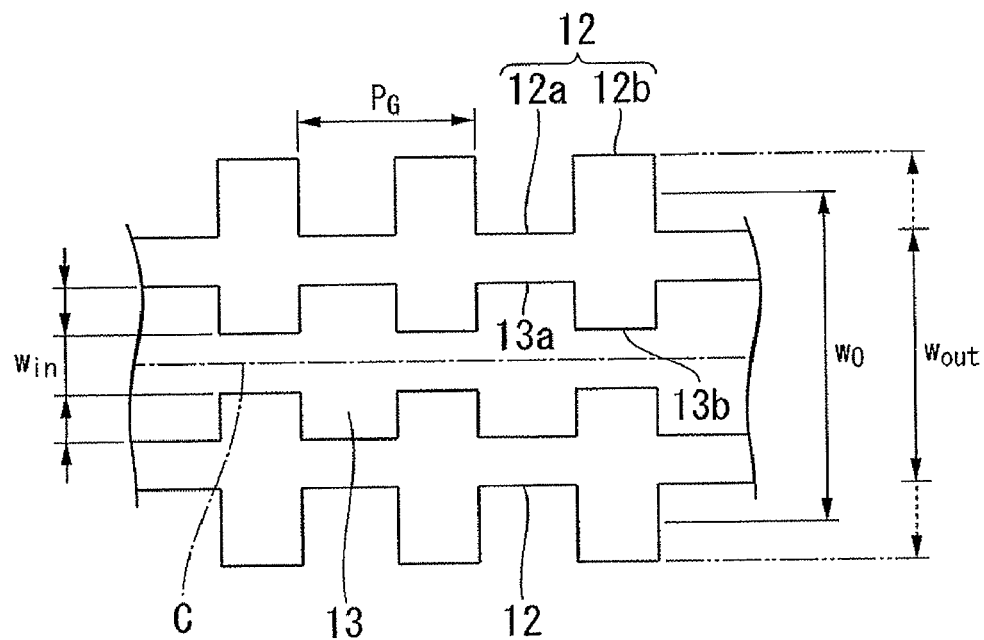
[FIG. 2]

As shown in FIG. 2, the sidewall grating structure 12 is formed by the valley 12a and the fin 12b formed on both sidewalls of the core 10. The core width $w_{out}$ of the core 10 changes periodically. The core width $w_{out}$ means the width of the core 10 in a direction which is perpendicular to the longitudinal direction of the optical waveguide, that is, the guided direction of signal light and which is parallel to the substrate. The core width is narrow in the valley 12a, and the core width is wide in the fin 12b.

The continuing distance of the valley 12a in the longitudinal direction (left and right direction in FIG. 1B) of the optical waveguide is called the longitudinal length of the valley. In addition, the continuing distance of the fin 12b in the longitudinal direction of the optical waveguide is called the longitudinal length of the fin. The result obtained by adding the longitudinal lengths of the fin portion and valley portion adjacent to each other is the grating pitch ($P_G$ in FIG. 2) at the position.

On the top surface 11 of the core 10, the grooved grating structure 13 is provided.

The grooved grating structure 13 has the fin 13b formed at the position corresponding to the fin 12b of the sidewall grating structure 12. The fin 13b is a part of the core 10 and protrudes toward the inside of the grooved structure 13. At the position where the fin 13b is formed, the lateral width of the grooved structure 13 is narrow. In addition, the grooved grating structure 13 has the valley 13a formed at the position corresponding to the valley 12a of the sidewall grating structure 12. The valley 13a is a part of the core 10 and has a recessed shape relative to the fin 13b. At the position where the valley 13a is formed, the lateral width of the grooved structure 13 is wide. That is, there is an inverse relationship in which the lateral width $w_{in}$ of the grooved structure 13 in the fin 13b is narrow while the lateral $w_{in}$ of the grooved structure 13 in the valley 13a is wide.

The grating pitch of the planar optical waveguide device according to the present embodiment has one value of the discretized pitches obtained as a result of having solved the inverse scattering problem, which will be described in detail later. That is, the planar optical waveguide device according to the present embodiment is different from the known uniform-pitch grating structure, the chirped-pitch grating structure, or the sampled grating structure.

FIG. 1B shows that the grating pitch has the different values like P, P+ΔP, and P−ΔP according to the position of the optical waveguide in the longitudinal direction. In addition, FIG. 1B shows a portion where the core width $w_{out}$ and the lateral width $w_{in}$ of the grooved structure 13 tends to increase from left to right. The optical waveguide according to the present embodiment also includes a portion (not shown in the figures) where the core width $w_{out}$ and the lateral width $w_{in}$ of the grooved structure 13 tends to decrease from left to right, which will be described later.

Thus, since the grating pitch $P_G$, the core width $w_{out}$, and the lateral width $w_{in}$ of the grooved structure 13 change in a complicated manner on the basis of the result of having solved the inverse scattering problem, the desired functionality can be given to the optical waveguide.

(Example of Use of the Device)

Figure 3:
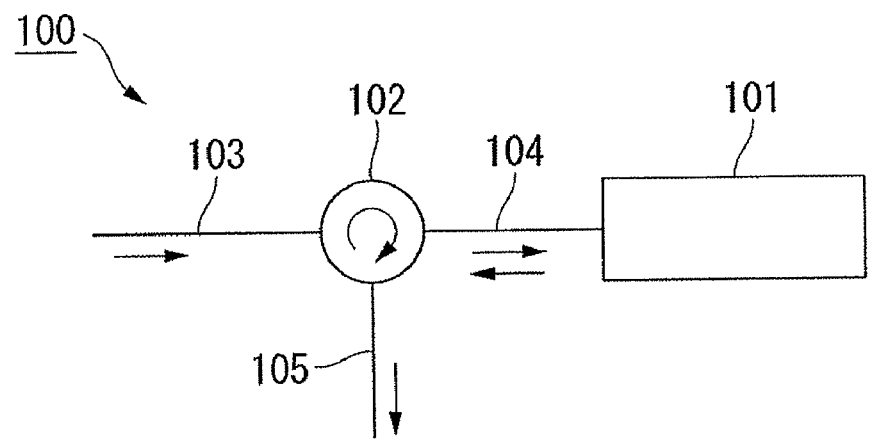
[FIG. 3]

FIG. 3 shows an example of a form 100 in which a planar optical waveguide device 101 is connected to optical transmission lines 103 and 105. Since the device 101 is a reflection-type device having a grating structure, the start edge serves as both an incidence edge and an emitting edge of the light signal. As shown in FIG. 3, the input/output optical fiber is usually connected to and used through a circulator 102. An input optical fiber 103 through which incident signal light propagates, a connecting optical fiber 104 which connects the planar optical waveguide device 101 with the optical circulator 102, and an output optical fiber 105 through which exiting signal light propagates are connected to the circulator 102.

In addition, it is preferable that an input/output converting section, which is generally called a mode field converter or a spot size converter, be added at the place where the planar optical waveguide device 101 and the connecting optical fiber 104 are optically connected to each other. This is to reduce the connection loss between the connecting optical fiber 104 and the device 101.

(Manufacturing Method of the Device)

In the present invention, in order to obtain the planar optical waveguide device with the grating structure in which the desired optical characteristic is obtained, the potential distribution in the light propagation direction of the optical waveguide is first calculated. This is converted into the equivalent refractive index distribution of the optical waveguide, and this is further converted into the dimension of the optical waveguide. In calculating the potential distribution, the wave equation in which the variable as the amplitude of electric wave propagating in the forward or backward direction of the optical waveguide is introduced leads to an equation, for example, the Zakharov-Shabat equation having the potential derived from differential of the logarithm of the equivalent refractive index of the optical waveguide. This equation is solved as the inverse scattering problem of numerically deriving the potential function from the complex reflection spectrum of the grating optical waveguide which is the spectrum of the intensity and the phase of reflection. Accordingly, the optical waveguide can be designed by estimating the potential distribution for realizing the desired reflection spectrum.

By using the above-described design method, it becomes possible to design and manufacture the Bragg grating device having a complicated optical characteristic which is difficult to realize with the known uniform-pitch grating device or chirped-pitch grating device. As a result, a device having a desired optical characteristic such as an optical dispersion compensator can be realized, which simultaneously compensates the wavelength dispersion and the dispersion slope of the optical fiber for transmission lines collectively in 40 channels in the DWDM optical fiber communication system.

(Design Method of the Potential Distribution)

A method of designing the potential distribution using the inverse scattering problem from the desired complex reflection spectrum is as follows.

It should be noted that, in the expressions used in the design procedure which will be described later, the longitudinal direction of the grating optical waveguide, that is, the light propagation direction is set as the z axis. The left and right direction in FIG. 1B is the z-axis direction. Assuming that the start point of the grating region of the grating optical waveguide device is z=0 and the final end point of the grating region of the grating optical waveguide device is the maximum z value coordinate, where the maximum z value is the length of the grating optical waveguide portion.

Firstly, the electromagnetic field propagating through the optical waveguide is formulated as follows by referring to the paper of Sipe (J.E. Sipe, L. Poladian, and C. Martijn de Sterke, "Propagation through nonuniform grating structures," Journal of the Optical Society of America A, Vol. 11, Issue 4, pp. 1307-1320 (1994)).

Assuming that the time variation of the electromagnetic field is $\exp(-i\omega t)$, the complex amplitude $E(z)$ of the electric field and the complex amplitude $H(z)$ of the magnetic field in the optical waveguide when the light propagation direction of the optical waveguide is set as the z axis are expressed as the following expressions (1) and (2), respectively, by the Maxwell's Equations.

[Expression 1]

$$\frac{dE(z)}{dz} = i\omega\mu_0 H(z) \quad (1)$$

[Expression 2]

$$\frac{dH(z)}{dz} = i\omega\varepsilon_0 n_{eff}^2(z) E(z) \quad (2)$$

Here, $E(z)$ is the complex amplitude of the electric field, $H(z)$ is the complex amplitude of the magnetic field, i is an imaginary unit, $\omega$ is an angular frequency, $\mu_0$ is the magnetic permeability of free space, $\varepsilon_0$ is the permittivity of free space, and $n_{eff}$ is the effective refractive index of the optical waveguide.

In order to build coupled-mode equations from the expressions (1) and (2), $E(z)$ and $H(z)$ are converted into the amplitude $A_+(z)$ of the traveling wave (electric wave propagating in the forward direction) and the amplitude $A_-(z)$ of the backward traveling wave (electric wave propagating in the backward direction) as shown in expressions (3) and (4). This device is a reflection-type device which realizes the desired optical characteristic by the reflection spectrum. The reflected wave corresponds to the amplitude $A_-(z)$ of the backward traveling wave.

[Expression 3]

$$A_+(z) = \frac{1}{2}\left[\frac{n_{eff}(z)}{n_{av}}\right]^{1/2}\left[E(z) + \sqrt{\frac{\mu_0}{\varepsilon_0}}\frac{H(z)}{n_{eff}(z)}\right] \quad (3)$$

[Expression 4]

$$A_-(z) = \frac{1}{2}\left[\frac{n_{eff}(z)}{n_{av}}\right]^{1/2}\left[E(z) - \sqrt{\frac{\mu_0}{\varepsilon_0}}\frac{H(z)}{n_{eff}(z)}\right] \quad (4)$$

Here, $n_{av}$ is a reference refractive index (average effective refractive index) of the optical waveguide and serves as the reference of $n_{eff}(z)$. The variables $A_+(z)$ and $A_-(z)$ satisfy the following expressions (5) and (6) assuming that $c_{light}$ is the light speed in free space.

[Expression 5]

$$\frac{dA_+(z)}{dz} = +i\frac{\omega}{c_{light}}n(z)A_+(z) + \frac{1}{2}\left(\frac{d\{\ln[n(z)]\}}{dz}\right)A_-(z) \quad (5)$$

[Expression 6]

$$\frac{dA_-(z)}{dz} = -i\frac{\omega}{c_{light}}n(z)A_-(z) + \frac{1}{2}\left(\frac{d\{\ln[n(z)]\}}{dz}\right)A_+(z) \quad (6)$$

Here, wavenumber $k(z)$ is expressed in the following expression (7). Here, $c_{light}$ is the light speed in free space.

[Expression 7]

$$k(z) = \frac{\omega}{c_{light}}n_{eff}(z) \quad (7)$$

In addition, $q(z)$ in expression (8) is the potential distribution in the coupled-mode equations.

[Expression 8]

$$q(z) = -\frac{1}{2}\frac{d}{dz}\ln[n_{eff}(z)] \quad (8)$$

When $n(z)$ of the expressions (5) and (6) is substituted into $n_{eff}(z)$ of the expressions (7) and (8) regarding $n(z)$ equal to $n_{eff}(z)$, the expressions (5) and (6) result in the Zakharov-Shabat equations shown in expressions (9) and (10).

[Expression 9]

$$\frac{dA_+(z)}{dz} - ik(z)A_+(z) = -q(z)A_-(z) \quad (9)$$

[Expression 10]

$$\frac{dA_-(z)}{dz} + ik(z)A_-(z) = -q(z)A_+(z) \quad (10)$$

Solving the inverse scattering problem shown in the Zakharov-Shabat equations is solving Gel'fand-Levitan-Marchenko type integral equations, which will be described later, and the procedure is disclosed in the paper of Frangos (P.V. Frangos and D.L. Jaggard, "A numerical solution to the Zakharov-Shabat inverse scattering problem," IEEE Transactions on Antennas and Propagation, Vol. 39, Issue. 1, pp. 74-79 (1991)).

In addition, the efficient solution of the Zakharov-Shabat equations is disclosed in the paper of Xiao (G Xiao and K. Yashiro, "An Efficient Algorithm for Solving Zakharov-Shabat Inverse Scattering Problem," IEEE Transaction on Antennas and Propagation, Vol. 50, Issue 6, pp. 807-811 (2002)).

The optical characteristic of the planar optical waveguide device having the grating structure according to the invention of this application is defined as the complex reflection spectrum r(k) at the start point of the optical waveguide (exiting light is also outputted at this point) in the following expression (11).

[Expression 11]

$$r(k) = \lim_{z \to -\infty} \left[ \frac{v_1(z,k)}{v_2(z,k)} \right] e^{2ikz} \quad (11)$$

As shown in the following expression (12), the Fourier transform of r(k) is impulse response R(z) of this system.

[Expression 12]

$$R(z) = \frac{1}{2\pi} \int_{-\infty}^{\infty} r(k) e^{-ikz} dk \quad (12)$$

By giving the distribution of reflectance and a desired group delay characteristic for the wavelength as the complex reflection spectrum r(k), the potential distribution function q(z) for realizing this can be solved numerically.

In the present invention, design process is carried out using the amplitude modulation type grating, in which the amplitude of the grating changes and the phase changes depending on the amplitude. Accordingly, in the complex reflection spectrum used as input data for the design, all frequency domains from the origin (that is, 0 Hz) of the frequency, where a predetermined group delay time characteristic is obtained, are included in order to increase the separability between the envelope of the amplitude of the grating and the phase of vibration of the grating.

Firstly, the solutions of the expressions (3) and (4) are expressed as in the following expressions (13) and (14).

[Expression 13]

$$A_+(z) = e^{ikz} + \int_{\infty}^{z} e^{ikz'} B_-(z, z') dz' \quad (13)$$

[Expression 14]

$$A_-(z) = e^{-ikz} + \int_{\infty}^{z} e^{-ikz'} B_+(z, z') dz' \quad (14)$$

$A_+(z)$ and $A_-(z)$ propagate in the +z and −z directions, respectively. The integral terms in the expressions (13) and (14) express the influence of reflection. From the expressions (13) and (14), the coupled-mode equations are transformed into the following Gel'fand-Levitan-Marchenko type integral equations (15) and (16).

[Expression 15]

$$B_+(z, y) + \int_{-\infty}^{z} B_-(z, z') R(z' + y) dz' = 0 \quad (15)$$

[Expression 16]

$$R(z+y) + B_-(z, y) + \int_{-\infty}^{z} B_+(z, z') R(z' + y) dz' = 0 \quad (16)$$

Here, the normalized time y is $y = c_{light} t$ (t is time), and z>y. R(z) is the inverse Fourier transform of the complex reflection spectrum r(k) having the wavenumber as a variable and is equivalent to the impulse response. By applying R(z) to solve the expressions (15) and (16), the potential distribution q(z) is calculated and expressed as expression (17).

[Expression 17]

$$q(z) = -2B_-(z,z) \quad (17)$$

By applying the obtained potential distribution q(z) to the following expression (18), the effective refractive index distribution $n_{eff}(z)$ of the grating optical waveguide is obtained.

[Expression 18]

$$n_{eff}(z) = n_{av} \exp\left[-2 \int_0^z q(s) ds\right] \quad (18)$$

In the present invention, the potential distribution q(z) of the expressions (8) and (17) is assumed to be the real number. As a result, the operation for transformation from the complex reflection spectrum r(k) to the impulse response (time response) R(z) becomes a real number type, and the amplitude changes and the phase changes depending on the amplitude.

In the effective refractive index distribution $n_{eff}(z)$ obtained as described above, a high refractive index values and a low refractive index values appear alternately at short pitches (periods), which shows the grating optical waveguide structure. In the grating structure, the refractive index difference between the high refractive index values and the low refractive index values, which are adjacent to each other, corresponding to the core width w in the fin and valley of the sidewall of the optical waveguide core, is not a constant but nonuniform with gradual change. In addition, the pitch with which the refractive index changes has certain limited discrete values. That is, the grating structure has a new structure which does not match any of the known uniform-pitch grating optical waveguide, the chirped-pitch grating optical waveguide, nor the sampled grating optical waveguide.

The grating pattern in which the amplitude changes is formed in the grating optical waveguide according to the present invention. Accordingly, the grating optical waveguide according to the present invention is of an amplitude modulation type in which the sign of the gradient of the envelope of the amplitude of the grating alternates. The sampled grating optical waveguide is characterized in that a region where the amplitude is zero continuously is interposed between the two points at which the sign of the gradient of the envelope alternates. In contrast, such a structure does not appear in the amplitude modulation type grating optical waveguide according to the present invention. Alternation of the sign shows a steep stepwise change or a discontinuous change occurring at the isolated single coordinate point. That is, it means that the sign of the gradient of the envelope alternates at the certain z coordinate. Since the amplitude becomes zero only at the isolated single coordinate point at which the sign of the gradient of the envelope alternates, the region where the amplitude is zero for a certain period does not actually appear. This makes it possible to reduce the waveguide length compared with the sampled Bragg grating.

A plurality of isolated coordinate points at which the sign of the gradient of the envelope alternates exists on the waveguide. At each coordination point, an appendant discontinuous change of phase occurs. If the phase changes discontinuously, there will be a change in a local period (pitch). Accordingly, the pitch has a different value from the half of the value obtained by dividing the center wavelength in the target spectrum at the corresponding coordinate point by the average value $n_{av}$ of the effective refractive index of the optical waveguide. The accuracy in specifying the coordination point, at which the sign of the gradient of the envelope alternates, depends on the discretization step of the coordinate z of the waveguide on the horizontal axis. Assuming that the step is $\Delta P$, the accuracy in specifying the coordination point is in the range of $\pm \Delta P$. Thus, in the amplitude modulation type grating optical waveguide according to the present invention, a coordination point exists at which the sign of the gradient of the envelope of the amplitude of the grating alternates and as a result, the pitch changes discretely.

The discretized grating pitch may be expressed as $P \pm N\Delta P$, where N is an integer related to the discretization parameter when solving the inverse scattering problem.

The discrete change of the pitch is a feature which is not observed in the chirped Bragg grating. In the chirped Bragg grating, the pitch changes continuously along the light propagation direction. In the chirped Bragg grating, the amplitude of the Bragg grating also changes simultaneously, but the change of the amplitude is only used to realize a secondary characteristic like apodization. In the chirped Bragg grating, the main characteristics, such as the number of channels and the phase characteristic, of the reflection spectrum of a filter are achieved by changing the frequency of the Bragg grating along the light propagation direction. The chirped grating cannot be formed in procedures disclosed herein. In order to form the chirped grating, the transformation from the complex reflection spectrum r(k) to the time response (impulse response) R(z) needs to be changed to the complex type. As a result, the potential distribution q(z) obtained by expression (17) becomes a complex number. Assuming that q(z) is a complex number, when calculating the effective refractive index distribution $n_{eff}(z)$ from q(z), it is necessary to take only the real part of q(z) because $n_{eff}(z)$ is the real number. Therefore, the amplitude modulation type grating structure of the present invention and the known chirped grating structure are different in the design method, and they are classified into different criteria. The chirped grating structure is classified into, so to speak, a frequency modulation type since it is opposite to the amplitude modulation type.

In all examples of this application, the operations used for transformation from the corresponding complex reflection spectrum to the impulse response are of a real number type and are targeted for the amplitude modulation type Bragg grating. The two conditions for selecting the amplitude modulation type Bragg grating are as follows.

(I) The frequency range of the designated spectral characteristic includes everything from the origin (frequency of zero) to the region where the corresponding spectrum channel exists.

(II) The real number type is selected in the above-described transformation from the complex reflection spectrum to the impulse response.

In the actual calculation procedure, the total length of the grating optical waveguide device is first determined, that is, the maximum value of z is specified. For example, in the case of a chromatic dispersion compensator, the maximum value of the group delay time which is to occur in the grating optical waveguide is determined from the channel bandwidth and group delay dispersion to be compensated. Accordingly, the minimum device length required can be determined by multiplying this by the light speed $c_{light}$ in free space and then dividing the result by the average value $n_{av}$ of the effective refractive index. The total length of the device is obtained by adding a certain extra length to the above result. Then, a discretization step is determined. As an example, when the total length of the device is set to 18,000 $\lambda$, using the designed center wavelength $\lambda$, as a reference and the discretization step at the z position is set to $\lambda/40$, the potential distribution q(z) of the chromatic dispersion compensator is calculated for 720,001 points from $z_0$ to $z_{720000}$.

Figure 6:
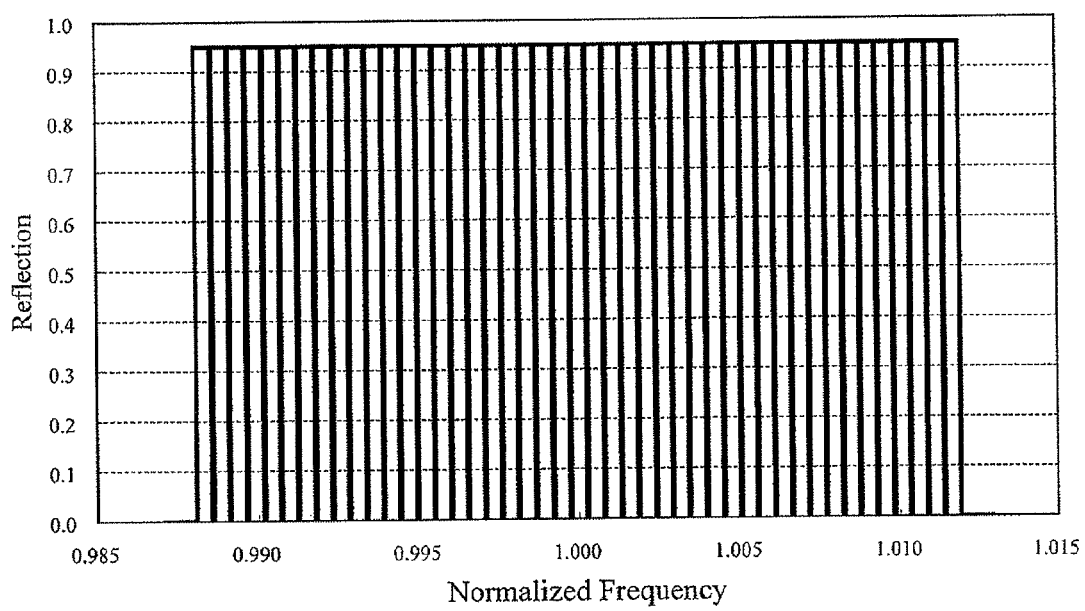
[FIG. 6]
Figure 7:
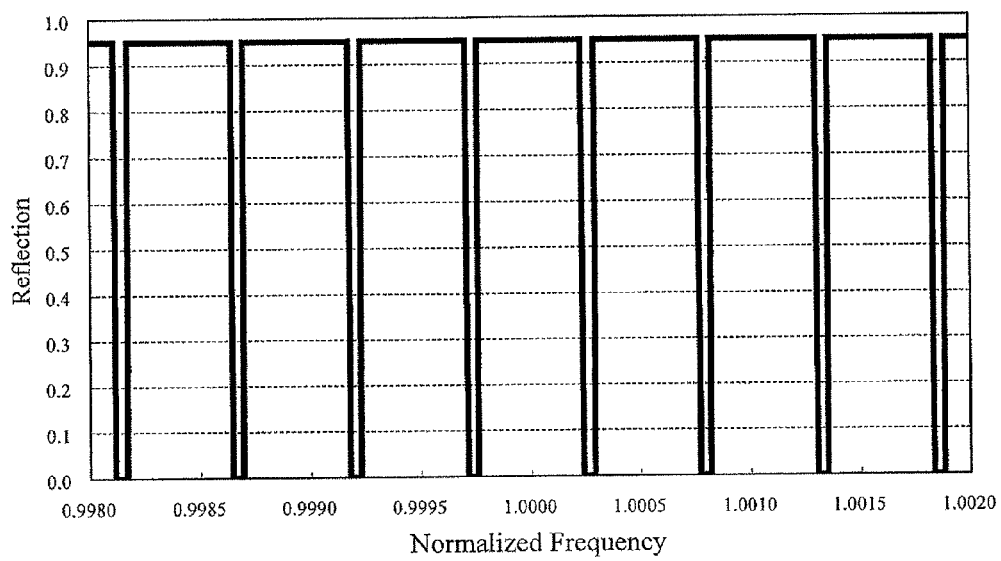
[FIG. 7]
Figure 8:
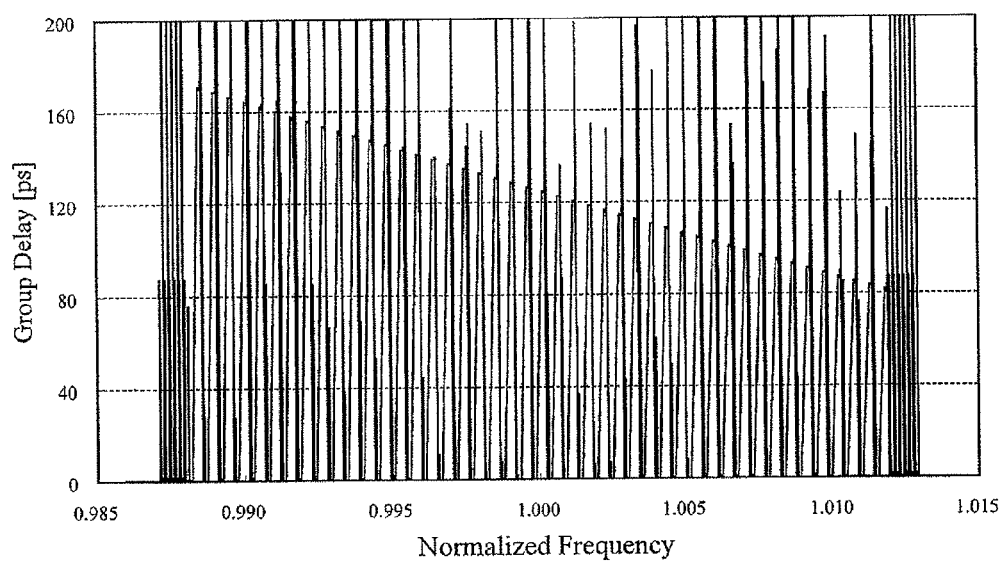
[FIG. 8]
Figure 9:
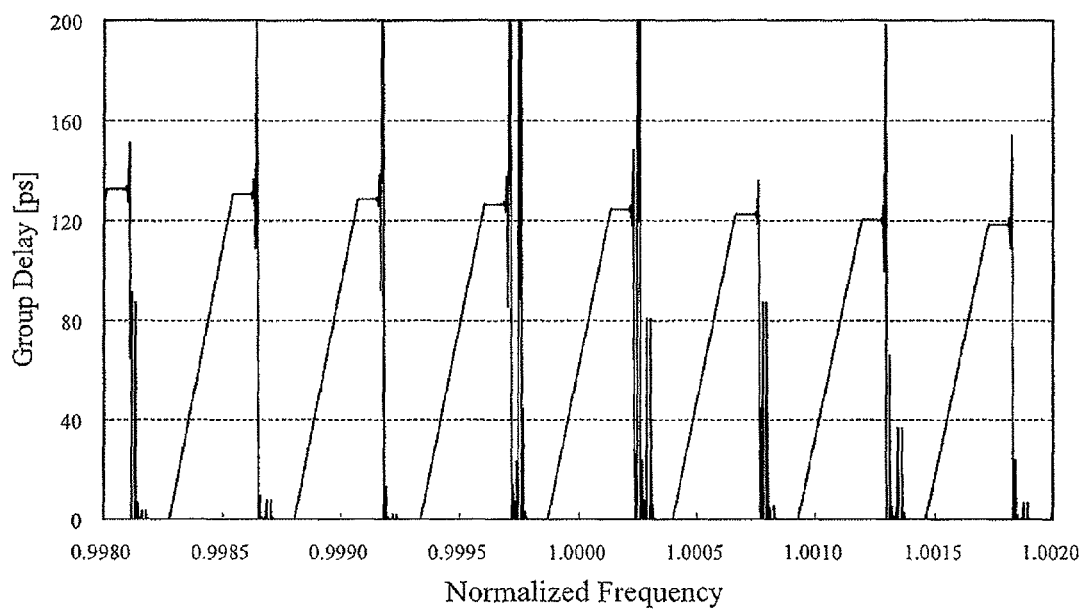
[FIG. 9]
Figure 10:
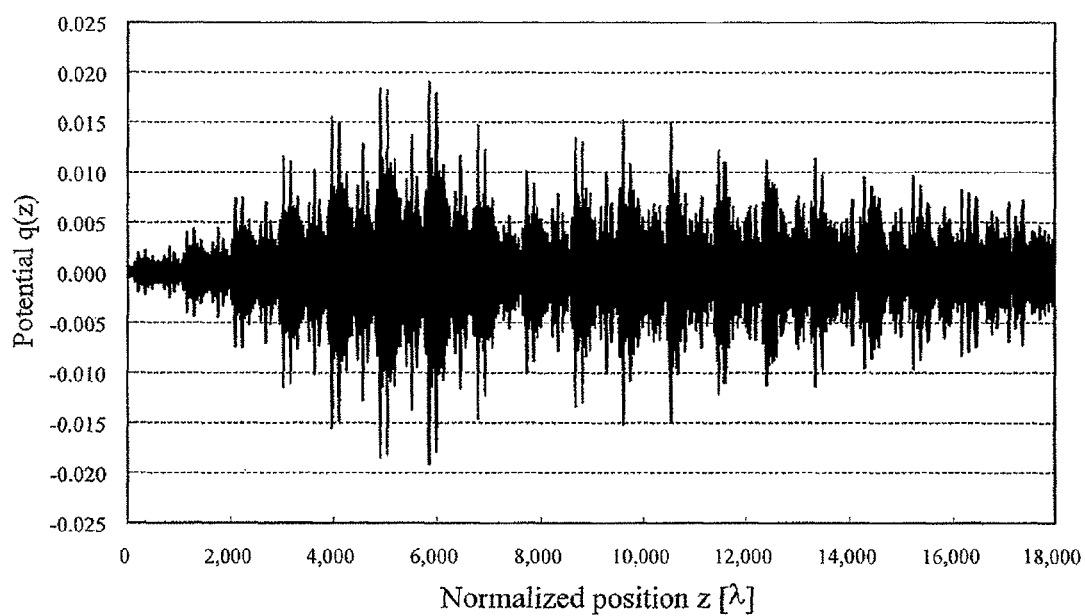
[FIG. 10]
Figure 11:
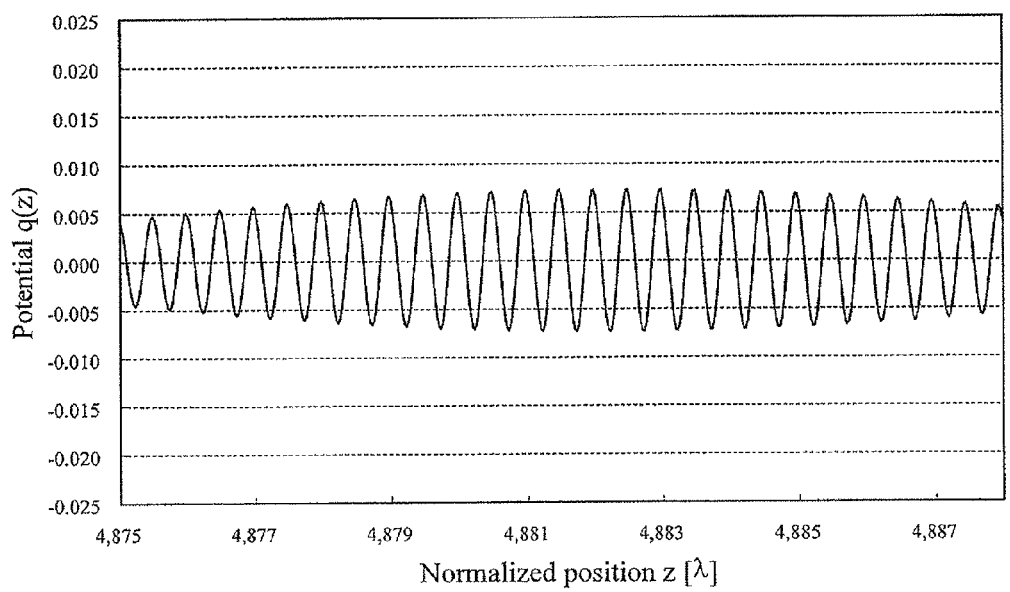
[FIG. 11]

When the distribution of the reflectance is shown in FIGS. 6 and 7 and the group delay characteristic is shown in FIGS. 8 and 9 as an example of the desired optical characteristic for a wavelength given as the complex reflection spectrum r(k), the potential distribution q(z) obtained by calculation is shown in FIGS. 10 and 11.

The potential distribution q(z) obtained by solving the inverse scattering problem is transformed into the effective refractive index distribution $n_{eff}(z)$ on the basis of the cross-sectional structure of the optical waveguide obtained beforehand, specifically, the relationship between the dimensions of core and the equivalent refractive index. Then, the core dimensions distribution in the light propagation direction (longitudinal direction) of the optical waveguide is calculated.

The sectional structure of the optical waveguide was designed for the optical waveguide device according to the first embodiment shown in FIGS. 1A to 1C.

Figure 4A:
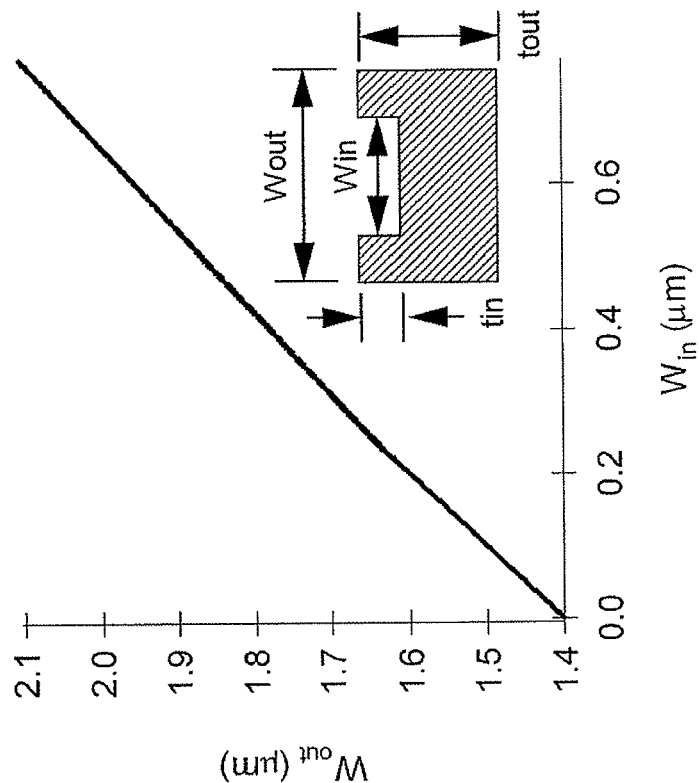
[FIG. 4A]
Figure 4B:
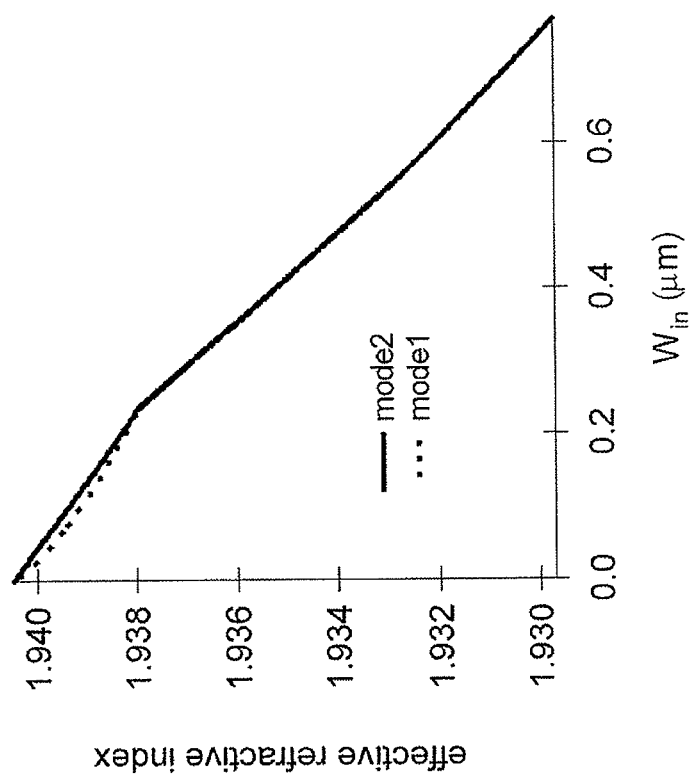
[FIG. 4B]
Figure 5:
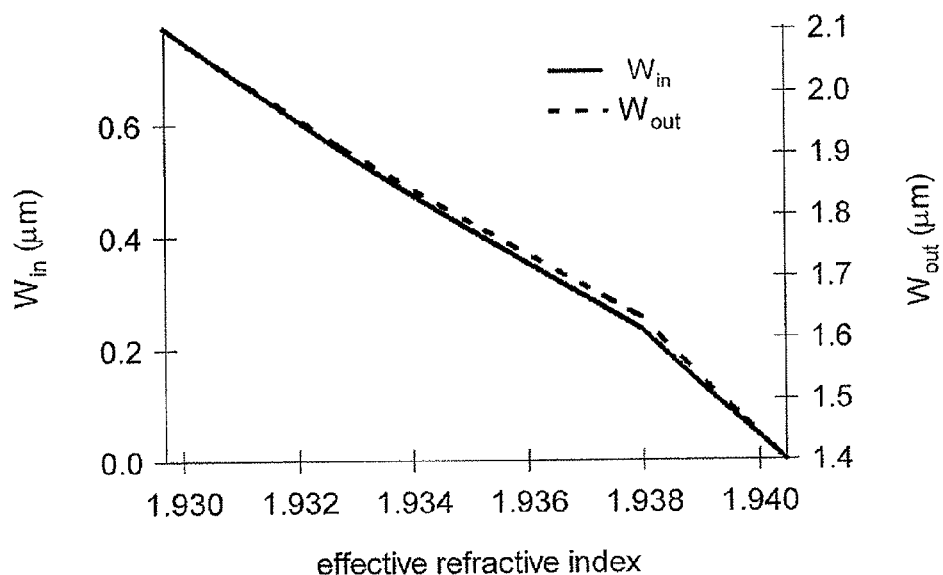
[FIG. 5]

The $w_{in}$ dependency of the effective refractive index to TE polarization (mode 1) and TM polarization (mode 2) is shown in FIG. 4A and the relationship between $w_{in}$ and $w_{out}$ is shown in FIG. 4B. In addition, the correlation of $w_{in}$ and $w_{out}$ with the effective refractive index $n_{eff}$ of the optical waveguide is shown in FIG. 5.

The correlation of the effective refractive index $n_{eff}$ with the lateral width $w_{in}$ of the grooved structure and the core width $w_{out}$ is obtained by changing the value of the lateral width $w_{in}$ of the grooved structure and the value of the core width $w_{out}$ to calculate the distribution of the electromagnetic field in the propagation mode from the cross-sectional structure of each optical waveguide and calculating the effective refractive index $n_{eff}$. The distribution of the electromagnetic field in propagation mode can be calculated by the mode solver program which adopts various methods, such as a mode matching method, a finite element method, or a beam propagation method.

In this case, the cladding material is silica ($SiO_2$) and the core material is silicon nitride (SiN). Both the thickness of the cladding located in a lower portion of the core and the thickness of the cladding located in an upper portion of the core are 2 µm. $t_{in}$ is 0.1 µm, and $t_{out}$ is 1.4 µm. Mode 1 and mode 2 correspond to the so-called TE mode and TM mode, respectively.

When the relationship of $w_{in}$ and $w_{out}$ is given as shown in FIG. 4B, the polarization dependence of the effective refractive index of the waveguide can be reduced as shown in FIG. 4A. FIG. 5 is obtained by calculating the correlation of the effective refractive index with $w_{in}$ and $w_{out}$ assuming that the effective refractive index in the TE polarization is the effective refractive index of the optical waveguide and then plotting the result. That is, in the present embodiment, a set of $w_{in}$ and $w_{out}$ corresponding to the predetermined $n_{eff}$ are obtained and the designed device is polarization independent.

From the effective refractive index distribution $n_{eff}(z)$ and FIG. 5, the lateral width $w_{in}$ of the grooved structure and the core width $w_{out}$ at each z coordinate can be calculated. From FIG. 5, the reference refractive index (average effective refractive index) $n_{av}$ is determined as 1.935, for example, by setting as the reference the approximate middle of the range obtained by examination of the relationship between the effective refractive index and the optical waveguide structure dimensions.

In the grooved grating structure according to the present embodiment obtained as described above, the refractive index difference between the high refractive index values and the low refractive index values, which are adjacent to each other, corresponding to the lateral width $w_{in}$ of the grooved structure in the fin and valley of the upper portion of the optical waveguide core, is not a constant but non-uniform with gradual change. In addition, the pitch with which the refractive index changes has certain limited discrete values. That is, the grooved grating structure according to the present invention has a new structure which does not match any of the known uniform-pitch grating optical waveguide, the chirped-pitch grating optical waveguide, nor the sampled grating optical waveguide, similar to the sidewall grating structure according to the present invention.

(Manufacturing Process of the Optical Waveguide)

Next, a manufacturing process of the optical waveguide device according to the first embodiment will be described.

Figure 12:
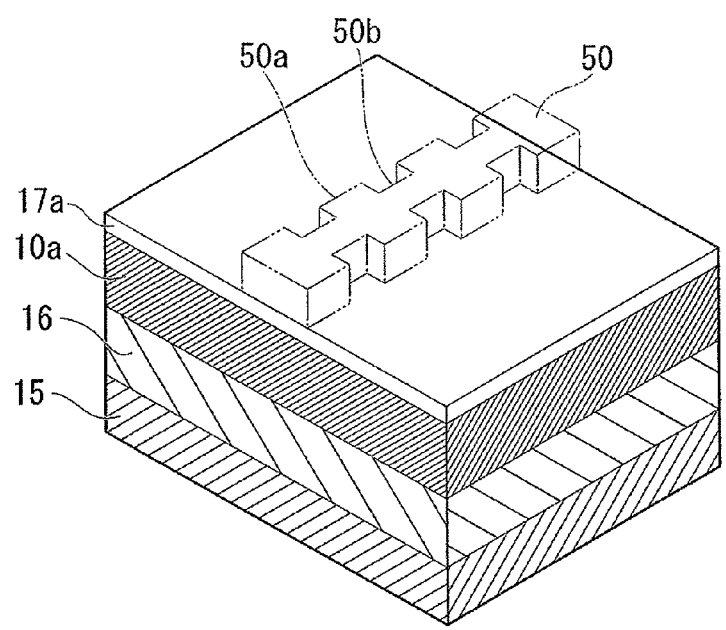
[FIG. 12]

Firstly, as shown in FIG. 12, a high refractive index material layer 10a which forms the core is formed up to the portion below the grooved region (height range where the grooved structure 13 is formed) (first high refractive index material layer forming step).

In addition, a low refractive index material layer 17a for forming the grooved grating structure 13 is deposited at a desired thickness on the high refractive index material layer 10a (low refractive index material layer forming step).

In the first high refractive index material layer forming step, the lower cladding 16 is formed on the support substrate 15 and then the first high refractive index material layer 10a is formed on the lower cladding 16. For example, the support substrate 15 is a silicon wafer, and the lower cladding 16 is an $SiO_2$ layer deposited at an appropriate thickness using CVD apparatus or the like. In addition, the first high refractive index material layer 10a is obtained by depositing an SiN layer, which is for forming the optical waveguide core 10, at a desired thickness using the CVD apparatus or the like. Here, the desired thickness of the first high refractive index material layer '10a is a value obtained by subtracting the depth of the groove ($t_{in}$ in FIG. 1C) of the grooved grating structure 13 from the thickness of the final SiN layer ($t_{out}$ in FIG. 1C).

In the low refractive index material layer forming step, the $SiO_2$ layer is deposited at a desired thickness on the SiN layer, thereby forming the low refractive index material layer 17a in which the grooved grating structure 13 is formed. Here, the desired thickness of the low refractive index material layer 17a is equal to or more than the depth of the groove ($t_{in}$ in FIG. 1C) of the grooved grating structure 13. If necessary, it is preferable that the thickness of the low refractive index material layer 17a be set to a value obtained by adding to the design value $t_{in}$ the margin for allowing a decrease in the thickness of the groove section filler 18 in the planarization process after the second high refractive index material layer forming step, which will be described later.

Then, as shown by the long dashed double-short dashed line in FIG. 12, a photoresist pattern 50 is formed on the low refractive index material layer 17a. The photoresist pattern 50 is for forming the groove section filler 18 (refer to FIG. 13) corresponding to the designed grooved grating structure 13. The pattern of a first photomask used to form the photoresist pattern 50 is shown in FIGS. 23 to 26, and the pattern of a second photomask used to form the photoresist pattern 50 is shown in FIG. 27A. In addition, the obtained photoresist pattern 50 is shown in more detail in FIG. 28. Here, only a part of the optical waveguide in the longitudinal direction is shown in FIGS. 23 to 26, 27A, and 28.

The groove section filler 18 serves to fill the inside of the grooved structure 13 of the optical waveguide device shown in FIG. 16 and is united with the upper cladding 17. The groove section filler 18 has a valley 18a (valley portions), which is a portion with a narrow lateral groove width, and a fin 18b (fin portions), which is a portion with a wide lateral groove width. The groove section filler 18 has a complementary shape for the core 10 around the grooved structure 13. That is, the valley 18a of the groove section filler 18 corresponds to the fin 13b of the grooved structure 13, and the fin 18b of the groove section filler 18 corresponds to the valley 13a of the grooved structure 13.

Figure 28:
[FIG. 28]

In order to form the photoresist pattern 50 shown in FIG. 28, two of the first photomask, which is the Levenson-type alternative phase-shifting photomask, and the second photomask, which is a binary-type photomask, are used as photomasks. Each photomask may be manufactured on the basis of drawing using CAD or the like. Moreover, in the following description, a shaded portion formed by projection of the chromium pattern of the first photomask onto the photoresist layer may be simply referred to as a 'first shaded portion'. At the same time, a shaded portion formed by projection of the chromium pattern of the second photomask onto the photoresist layer may be simply referred to as a 'second shaded portion'. In the meantime, although the portion (for example, a light shielding layer) where light is blocked in the photomask is called a 'chromium pattern' for illustration herein, the material of the light shielding layer is not limited to chromium (Cr) in the present invention. For example, MoSi may be used. In addition, the phase-shifting photomask is not limited to the Levenson-type alternative phase-shifting photomask, and a halftone-type phase-shifting mask and the like may also be used. A glass substrate formed of silica glass, for example, is suitable for use as a substrate of the photomask.

Figure 23:
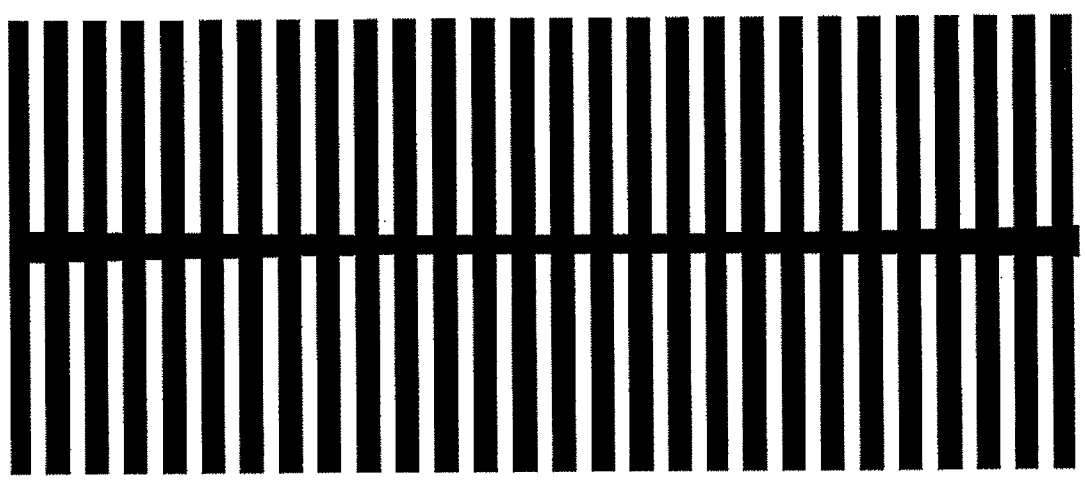
[FIG. 23]
Figure 24:
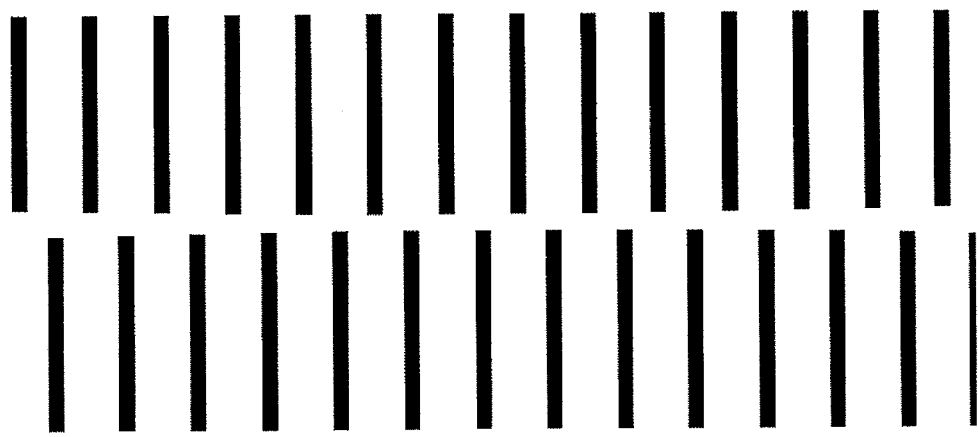
[FIG. 24]
Figure 25:
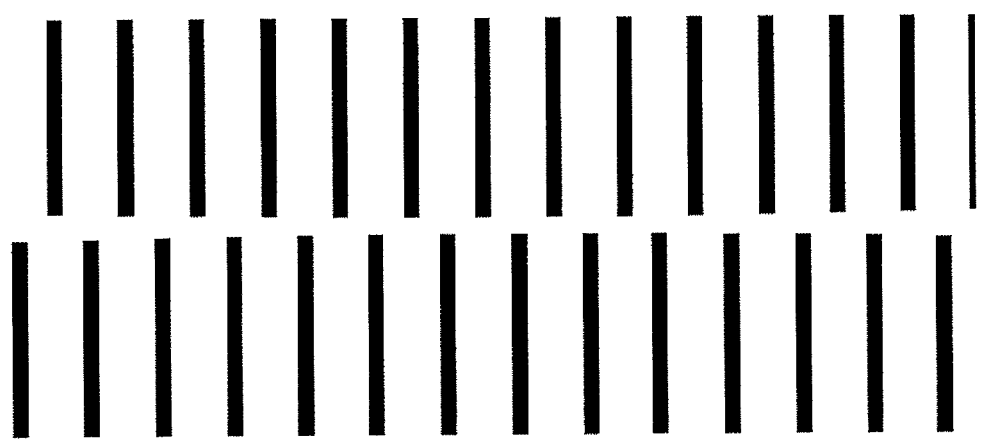
[FIG. 25]
Figure 26:
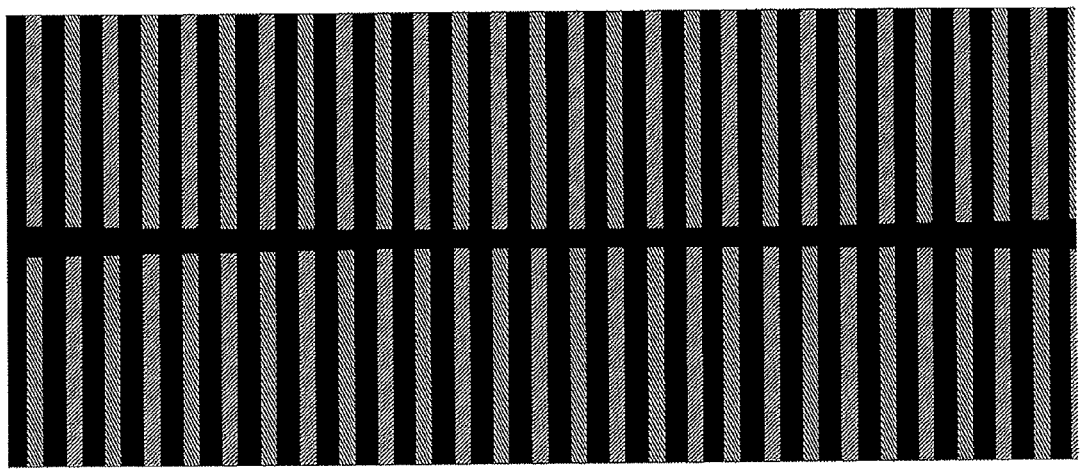
[FIG. 26]
Figure 27A:
[FIG. 27A]
Figure 27A:

The first Levenson-type alternative phase-shifting photomask has a structure shown in FIG. 26. The pattern expressed in black in FIG. 23 is a chromium pattern formed of chromium (Cr). The pattern expressed in black as a reverse pattern in FIG. 24 is a transmission pattern (simply referred to as a 'pi phase-shifting pattern') corresponding to the phase-shifting amount π(180°). The pattern expressed in black as a reverse pattern in FIG. 25 is a transmission pattern (simply referred to as a 'zero phase-shifting pattern') corresponding to the phase-shifting amount zero. In the first phase-shifting photomask, the chromium pattern is extended such that the shaded portion corresponding to the valley 13a becomes sufficiently wider than the design size of the lateral width (that is, the lateral width of the groove section filler 18 in the fin 18b) of the grooved structure 13 in the valley 13a. The exposed portion formed by the first phase-shifting photomask exists outside the first shaded portion.

The second binary-type photomask is used for adjust the lateral width of the grooved structure 13 in the valley 13a to the design size $w_{in}$. The pattern expressed in black as a reverse pattern in FIG. 27A is a transmission pattern of the second binary-type photomask. The exposed portion formed by the second binary-type photomask exists outside the second shaded portion.

When the two-step exposure is performed using the pair of photomasks, the region where the first and second shaded portions overlap each other becomes a non-exposed portion in which exposure is not performed. As a result of the combination of the exposed portions obtained by performing the two-step exposure, the exposure pattern expressed in white in FIG. 28 is obtained. In addition, the photoresist pattern expressed in black in FIG. 28 is obtained by the development step.

In order to obtain the photoresist pattern 50 used to form the grating structure including the fin 13*b* and the valley 13*a* as described above, only the portion of the groove at each of the position 50*b* corresponding to the fin 13*b* and the position 50*a* corresponding to the valley 13*a* needs to be made as a non-exposed portion (portion which remains after development). In addition, it is necessary to expose the photoresist in the outside of the non-exposed portion in order to increase the solubility at the development step. In this case, a photoresist having a property in which the solubility increases by exposure (that is, a positive photoresist) is used.

When forming the photoresist pattern 50 of the present embodiment, since the fin portions 13*b* and the valley portions 13*a* are alternately arranged, there a problem in that the groove width repeatedly increases and decreases along the longitudinal direction of the optical waveguide and that the pitch of the increase and decrease is very small.

For example, a method based on the single exposure step using either the binary-type photomask or the phase-shifting photomask may be considered as illustrated in first and second comparative examples, which will be described later.

In the method of using only the binary-type photomask, however, it is difficult to resolve if the pitch of the groove structure is not sufficiently long compared with the wavelength used for exposure.

Moreover, in the method of using only the phase-shifting photomask, light of the phase-shifting amount zero and light of the phase-shifting amount π overlap each other (that is, are offset by each other) and cause phase conflict at the point shifting amount alternates, resulting in underexposure. As a result, there is a problem in that the unintended residual line pattern will remain at the underexposed place, occurs after development.

In addition, a method of using the phase-shifting photomask and the binary-type photomask together in order to remove the residual line pattern caused by use of the phase-shifting photomask may be considered. In this case, as explained in a third comparative example which will be described later, a method of using the phase-shifting photomask in order to shade a region corresponding to both the groove width in the fin 13*b* and the groove width in the valley 13*a* and of using the binary-type photomask in the additional exposure step for removing the unintended residual line pattern formed by phase conflict may be considered. In this case, however, three of (i) the lateral width of the chromium pattern of the phase-shifting photomask at the position corresponding to the fin 13*b*, (ii) the lateral width of the chromium pattern of the phase-shifting photomask at the position corresponding to the valley 13*a*, and (iii) the lateral width of the chromium pattern of the binary-type photomask at the position corresponding to the valley 13*a* need to be realized with high precision as designed. In addition, the lateral resist width after development and the width of the groove section filler after etching at the position corresponding to the valley 13*a* are determined on the basis of the lateral width of a portion where two shaded portions caused by the chromium patterns of (ii) and (iii) overlap each other. In this case, there is a problem in that the groove width of the valley 13*a* becomes short when the two photomasks are exposed in the two exposure steps under conditions in which the exposure positions by two photomasks laterally deviate from each other in the groove width direction.

Therefore, in the present embodiment, both (i) the lateral width of the chromium pattern of the phase-shifting photomask at the position corresponding to the fin 13*b* a and (ii) the lateral width of the chromium pattern of the binary-type photomask at the position corresponding to the valley 13*a* are set with high precision as designed, but both (iii) the lateral width of the chromium pattern of the phase-shifting photomask at the position corresponding to the valley 13*a* and (iv) the lateral width of the chromium pattern of the binary-type photomask at the position corresponding to the fin 13*b* are not precisely matched with the design size, which will be described in detail later. That is, in the present embodiment, the groove width in the fin 13*b* is matched with the design size by using the phase-shifting photomask, and the groove width in the valley 13*a* is matched with the design size by using the binary-type photomask. Accordingly, even if the exposure is performed in the two exposure steps under conditions in which the exposure positions by two photomasks laterally deviate from each other in the groove width direction, the influence of deviation on the lateral resist width after development and the lateral width of the groove section filler after etching is narrow. As a result, the photoresist pattern 50 can be formed with high precision.

In addition, when the lateral width of the second shaded portion at the position corresponding to the fin 13*b* is narrower than the lateral groove width in the fin 13*b* in the design, the lateral groove width in the fin 13*b* which is actually formed becomes narrower than the design size. Accordingly, at the position corresponding to the fin 13*b*, the lateral width of the second shaded portion is made wider than the lateral groove width in the fin 13*b* in the design.

In the meantime, in this specification, 'the lateral width of the shaded portion corresponds to the groove width' means that the lateral width of the shaded portion is controlled to be adjusted to the designed lateral groove width. It corresponds to the case of 'the lateral width of the shaded portion corresponds to the lateral groove width', when the lateral width of the shaded portion formed by projecting the chromium pattern of the photomask while reducing it at the predetermined rate onto the photoresist layer is equal to the designed lateral groove width or within the allowable error range. Accordingly, the size of the chromium pattern is determined in consideration of the reduction ratio at the time of projection.

The method of forming the photoresist pattern 50 is as follows, for example.

An unexposed photoresist layer is formed on the low refractive index material layer 17*a* (photoresist layer forming step). The photoresist layer forming step may be performed by coating, for example.

Then, the photoresist layer is exposed using the phase-shifting photomask (first exposure step). As described above, in the first shaded portion corresponding to the chromium pattern of the phase-shifting photomask, the lateral width of the shaded portion corresponds to the designed lateral width of the grooved structure 13 in the fin 13*b* at the position corresponding to the fin 13*b* of the grooved structure 13, and the lateral width of the shaded portion is wider than the designed lateral width of the grooved structure 13 in the valley 13*a* at the position corresponding to the valley 13*a*. The exposed portion exists outside the first shaded portion. Accordingly, in the first exposure step, the designed lateral groove width is shaded at the position corresponding to the fin 13*b*, and the portion wider than the design size is shaded at the position corresponding to the valley 13*a*.

Then, the photoresist layer is exposed using the binary-type photomask (second exposure step). As described above, in the second shaded portion caused by the chromium pattern of the binary-type photomask, the lateral width of the shaded portion is wider than the designed lateral width of the grooved structure 13 in the fin 13b at the position corresponding to the fin 13b of the grooved structure 13, and the lateral width of the shaded portion corresponds to the designed lateral width of the grooved structure 13 in the valley 13a at the position corresponding to the valley 13a. The exposed portion exists outside the second shaded portion. Accordingly, in the second exposure step, the portion wider than the design size is shaded at the position corresponding to the fin 13b, and the lateral groove width designed is shaded at the position corresponding to the valley 13a.

In addition, if the characteristic of the binary-type photomask is taken into consideration, it is preferable to make small the change in the lateral width of the second shaded portion along the longitudinal direction of the optical waveguide.

Figure 27B:
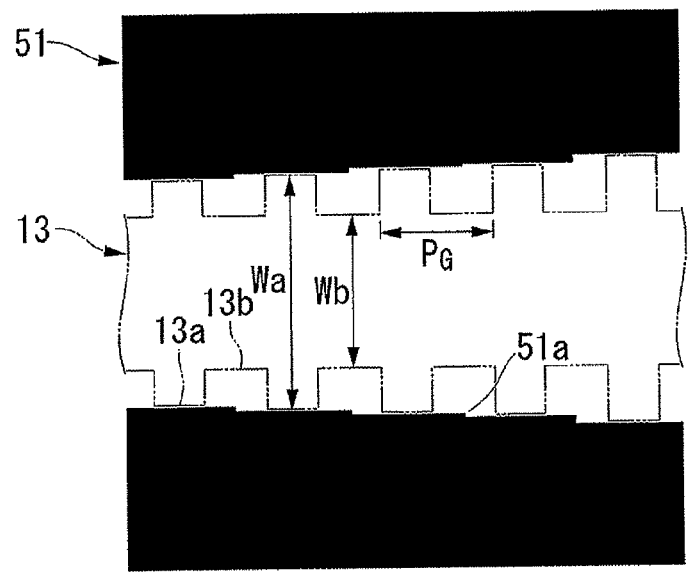
[FIG. 27B]
Figure 27C:
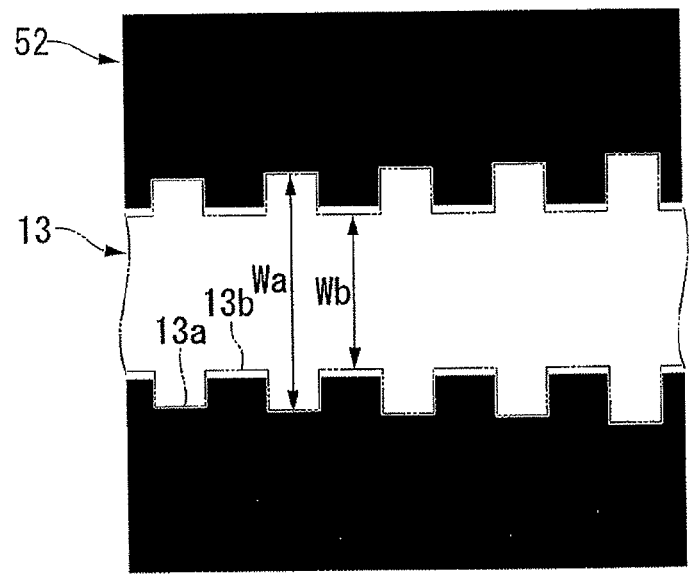
[FIG. 27C]
Figure 27D:
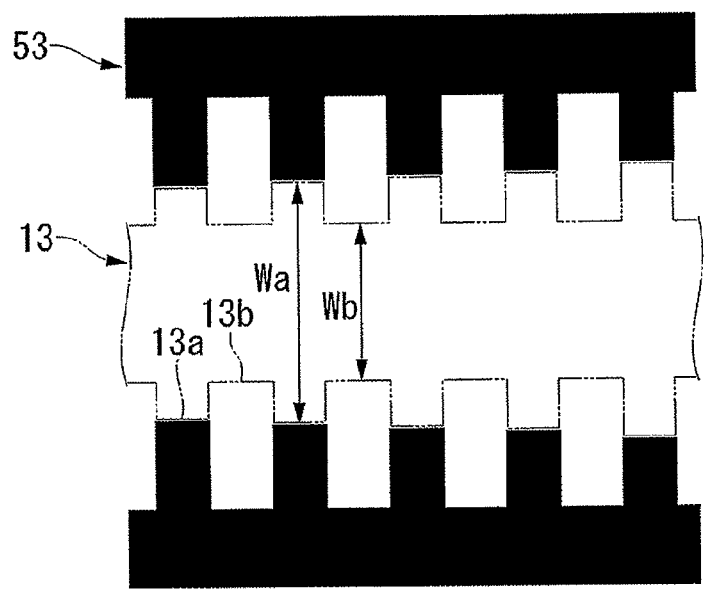
[FIG. 27D]

For example, it may be possible to consider the case where the lateral width of the second shaded portion at the position corresponding to the fin 13b is narrower than the designed lateral groove width Wa in the valley 13a like the binary-type photomask (first modified example) having a reverse pattern 52 in FIG. 27C or the case where the lateral width of the second shaded portion at the position corresponding to the fin 13b is wider than the designed lateral groove width Wa in the valley 13a like the binary-type photomask (second modified example) having a reverse pattern 53 in FIG. 27D.

However, in the case shown in FIG. 27C, when the exposure position by binary-type photomask deviates in the longitudinal direction (z direction) of the waveguide, there is a possibility that a part of the width of the groove section filler at the valley 13a will be narrowed (thinned) in a step-wise manner. Moreover, in the case shown in FIG. 27D, when the exposure position by binary-type photomask deviates in the longitudinal direction (z direction) of the waveguide, there is a possibility that an elongated photoresist pattern will remain on a part of the inside of the valley 13a.

Therefore, it is preferable that the lateral width of the second shaded portion at the position corresponding to the fin 13b be the middle value of the lateral widths of the second shaded portions at the positions corresponding to the two valley portions 13a adjacent to the fin 13b. That is, assuming that the lateral width of the second shaded portion at the position corresponding to one of the valley portions 13a which is adjacent in the positive direction on the z axis of the certain fin 13b is s1 and the lateral width of the second shaded portion at the position corresponding to the other of the valley portions 13a which is adjacent in the negative direction on the z axis is s2, it is preferable that the lateral width of the second shaded portion at the position corresponding to the fin 13b be equal to or more than s1 and equal to or less than s2 (when $s1 \leq s2$) or equal to or more than s2 and equal to or less than s1 (when $s2 \leq s1$).

Particularly in the place where the lateral widths of the second shaded portions at the positions corresponding to the two adjacent valley portions 13a are different as shown in FIG. 27B, it is preferable to provide a step 51a, at which the lateral width of the second shaded portion changes, in the middle of the fin 13b. Moreover, on both sides of the step 51a, it is preferable that the lateral width of the second shaded portion at the position corresponding to the fin 13b be equal to the lateral width of the second shaded portion at the position corresponding to each of the two adjacent valley portions 13a.

Accordingly, the precision of the lateral groove width Wa in the valley 13a is unlikely to be reduced even if the positional deviation of the binary-type photomask occurs in the longitudinal direction (z direction) of the optical waveguide. In addition, since the change in the lateral width of the second shaded portion along the longitudinal direction of the optical waveguide occurs once for one grating pitch $P_G$, it becomes easier to manufacture the mask.

The exposure can be performed by using a scanner. The wavelength of the light used for exposure may be appropriately set according to the characteristic of the photoresist. For example, it may be set to 248 nm.

A development step of developing the photoresist layer, an etching step of etching the low refractive index material layer 17a using the photoresist pattern 50 obtained by the development step, and a step of removing the remaining photoresist are sequentially performed after the two-step exposure (groove section filler forming step). As a result, as shown in FIG. 13, the groove section filler 18 having the fin 18b and the valley 18a on the sidewall can be formed.

After forming the groove section filler 18, a high refractive index material (for example, SiN) which forms the core 10 is deposited at a desired thickness using the CVD apparatus or the like (second high refractive index material layer forming step).

Figure 13:
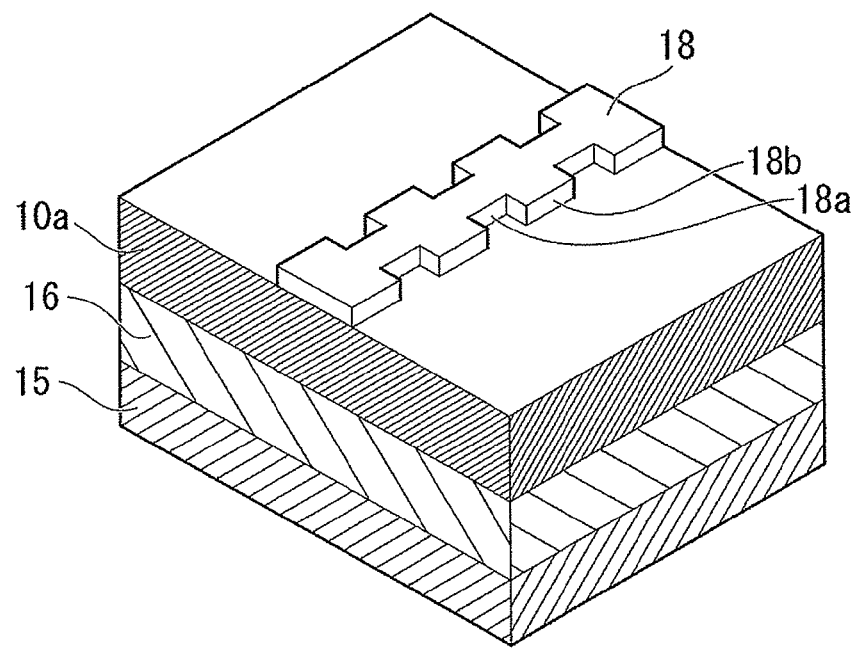
[FIG. 13]
Figure 14A:
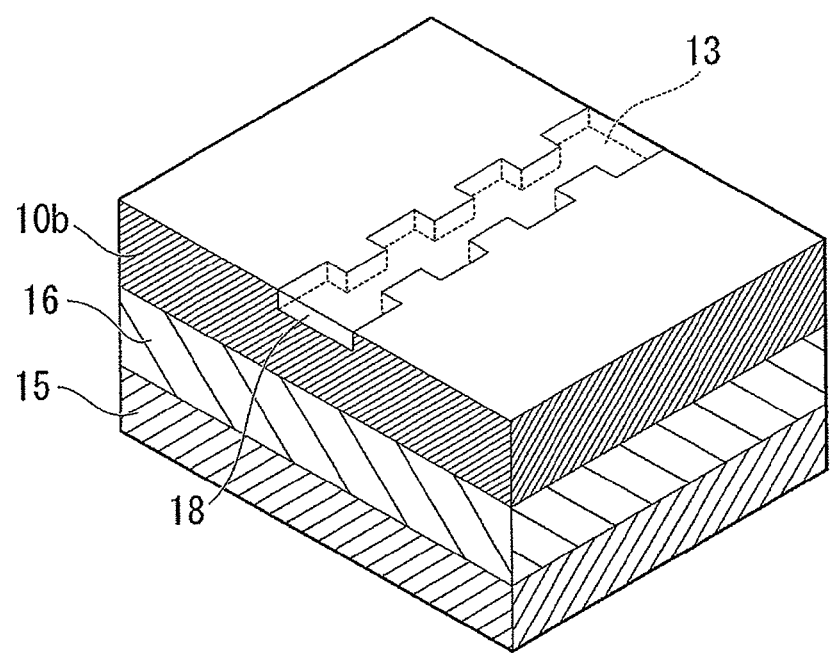
[FIG. 14A]

The desired thickness referred herein is a thickness when the sum of the thickness of the high refractive index material layer 10a in FIG. 13 and the thickness newly deposited after formation of the groove section filler 18 is equal to or more than the thickness of the final core 10 ($t_{out}$ in FIG. 1C). Since the high refractive index material is also deposited on the groove section filler 18, the surface is made flat by chemical mechanical polishing (CMP) or the like so that the high refractive index material does not remain on the groove section filler 18, as shown in FIG. 14A (planarization process). The thickness of the high refractive index material layer 10b after polishing corresponds to the thickness of the final core 10.

When the thickness of the low refractive index material layer 17a is made thicker than the design value $t_{in}$ in the low refractive index material forming step which is described above, the thickness of the groove section filler 18 is decreased by the predetermined amount in the planarization process. As a result, it is possible to surely prevent the high refractive index material from remaining on the groove section filler 18. In this case, the thickness of the groove section filler 18 after polishing corresponds to the depth of the groove of the grooved grating structure 13 ($t_{in}$ in FIG. 1C).

Figure 14B:
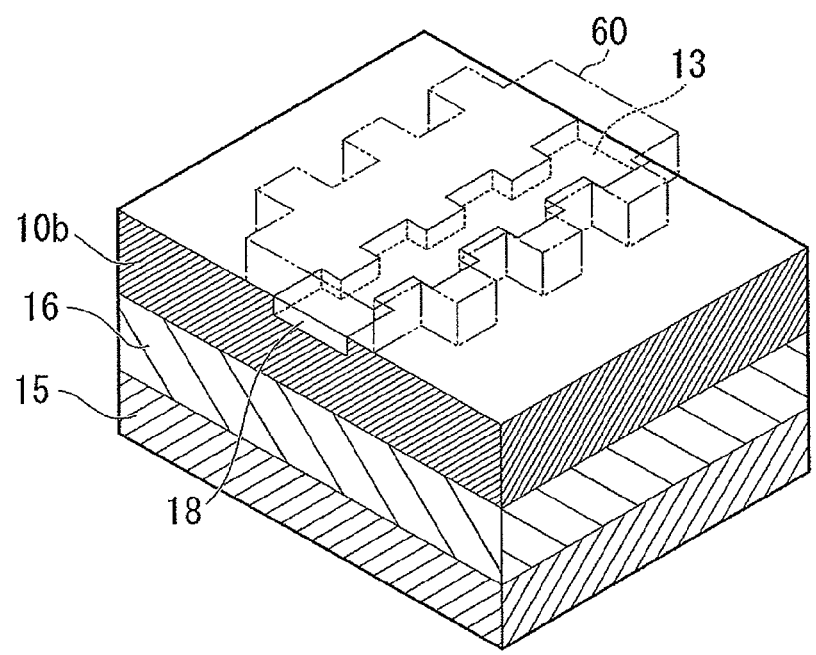
[FIG. 14B]

Then, as shown by the long dashed double-short dashed line in FIG. 14B, the photoresist pattern 60 is formed on the high refractive index material layer 10b. The photoresist pattern 60 corresponds to the designed sidewall grating structure 12. The pattern of a first photomask used to form the photoresist pattern 60 is shown in FIGS. 17 to 20, and the pattern of a second photomask used to form the photoresist pattern 60 is shown in FIG. 21. In addition, the obtained photoresist pattern 60 is shown in more detail in FIG. 22. In the meantime, only a part of the optical waveguide in the longitudinal direction is shown in FIGS. 17 to 22.

Figure 22:
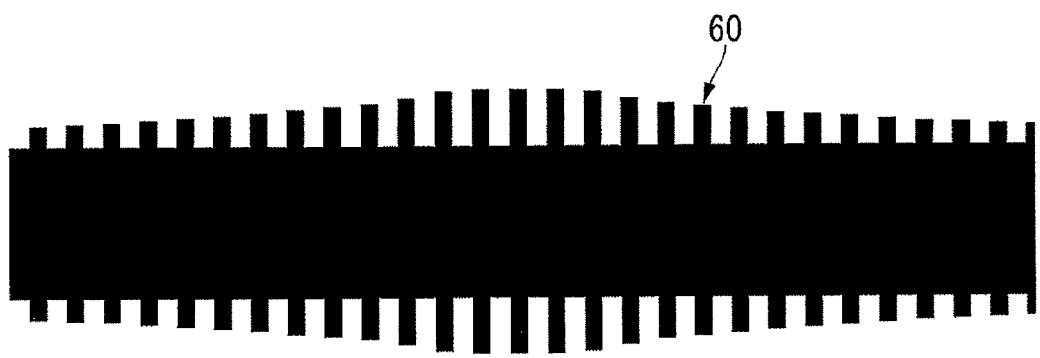
[FIG. 22]

In order to form the photoresist pattern 60 shown in FIG. 22, two of the first photomask, which is the Levenson-type alternative phase-shifting photomask, and the second photomask, which is a binary-type photomask, are used as photomasks. Each photomask may be manufactured on the basis of drawing using the CAD or the like.

Figure 17:
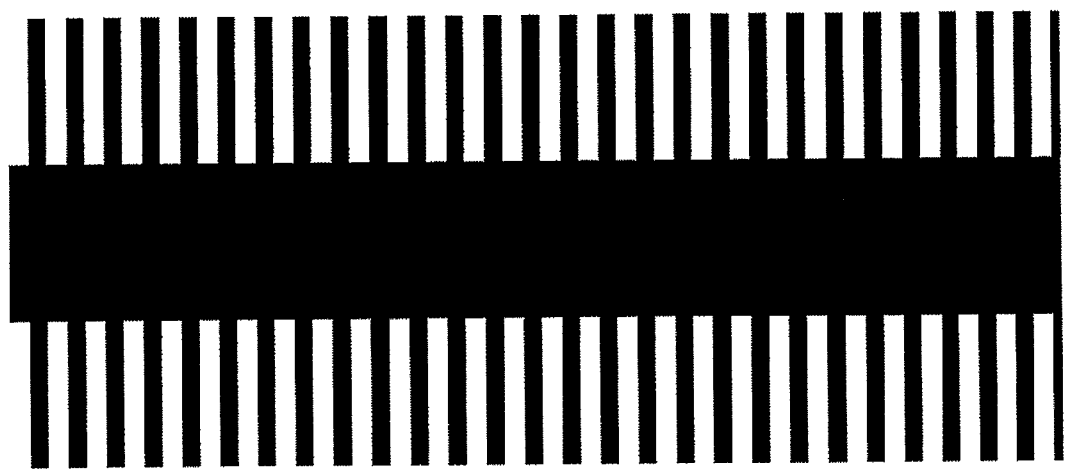
[FIG. 17]
Figure 18:
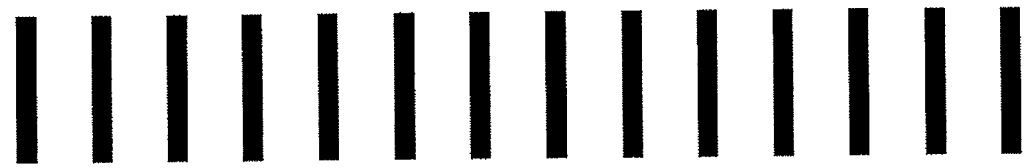
[FIG. 18]
Figure 18:
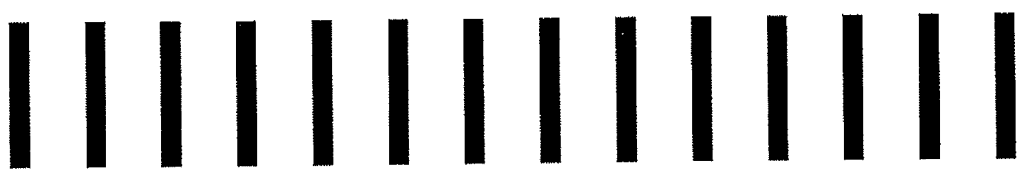
Figure 19:
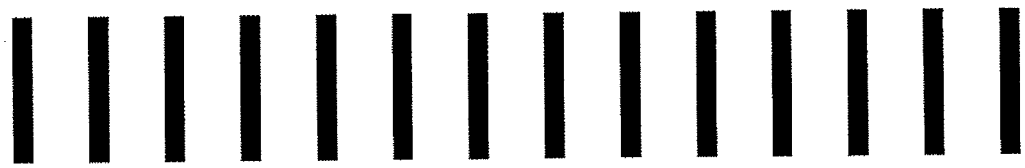
[FIG. 19]
Figure 19:
Figure 20:
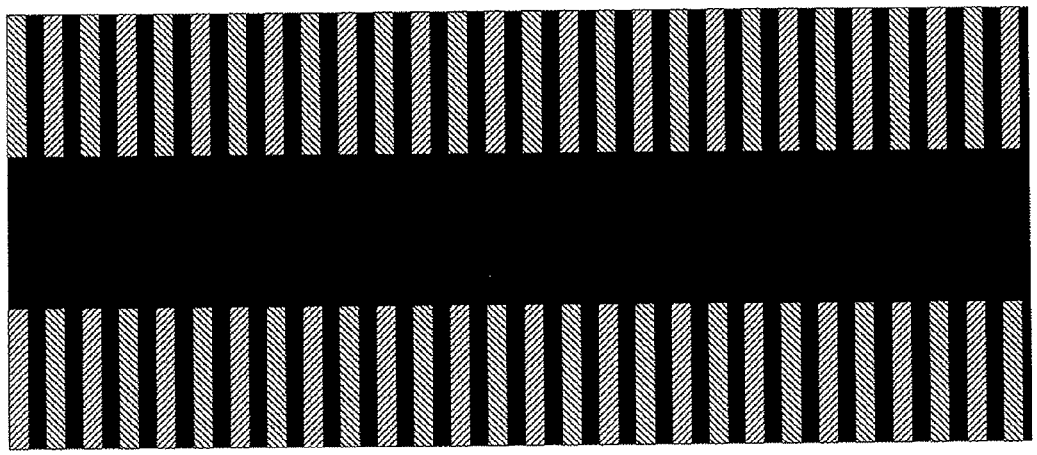
[FIG. 20]
Figure 21:
[FIG. 21]

The first Levenson-type alternative phase-shifting photomask has a structure shown in FIG. 20. The pattern expressed in black in FIG. 17 is a chromium pattern formed of chromium (Cr). The pattern expressed in black as a reverse pattern in FIG. 18 is a transmission pattern (simply referred to as a 'pi phase-shifting pattern') corresponding to the phase-shifting amount π(180°). The pattern expressed in black as a reverse pattern in FIG. 19 is a transmission pattern (simply referred to as a 'zero phase-shifting pattern') corresponding to the phase-shifting amount zero. In the first phase-shifting photomask, the chromium pattern is extended such that the shaded portion corresponding to the fin 12b becomes sufficiently wider than the design size of the core width of the fin 12b. The exposed portion formed by the first phase-shifting photomask exists outside the first shaded portion.

The second binary-type photomask is used to adjust the core width of the fin 12b to the design size. The pattern expressed in black as a reverse pattern in FIG. 21 is a transmission pattern of the second binary-type photomask. The exposed portion formed by the second binary-type photomask exists outside the second shaded portion.

When the two-step exposure is performed by using the pair of photomasks, the region where the first and second shaded portions overlap each other becomes a non-exposed portion in which exposure is not performed. As a result of the combination of the exposed portions obtained by performing the two-step exposure, the exposure pattern expressed in white in FIG. 22 is obtained. In addition, the photoresist pattern expressed in black in FIG. 22 is obtained by the development step.

Particularly in the second binary-type photomask, as shown in FIG. 21, it is preferable that the lateral width of the second shaded portion at the position corresponding to the valley 12a have the middle value of the lateral widths of the second shaded portions at the positions corresponding to the two fin portions 12b adjacent to the valley 12a. For example, in the place where the lateral widths of the second shaded portions at the positions corresponding to the two adjacent fin portions 12b are different, the step by which the lateral width of the second shaded portion changes is preferably provided in the middle of the valley 12a. Moreover, on both sides of the step, it is preferable that the lateral width of the second shaded portion at the position corresponding to the valley 12a be equal to the lateral width of the second shaded portion at the position corresponding to each of the two adjacent fin portions 12b.

The method of forming the photoresist pattern 60 for the sidewall grooved grating structure 12 is the same as the above-described method of forming the photoresist pattern 50 for the upper grating structure 13.

That is, an unexposed photoresist layer is formed on the high refractive index material layer 10b (photoresist layer forming step).

Then, the photoresist layer is exposed using the phase-shifting photomask shown in FIG. 20 (first exposure step).

Then, the photoresist layer is exposed using the binary-type photomask shown in FIG. 21 (second exposure step).

Figure 15:
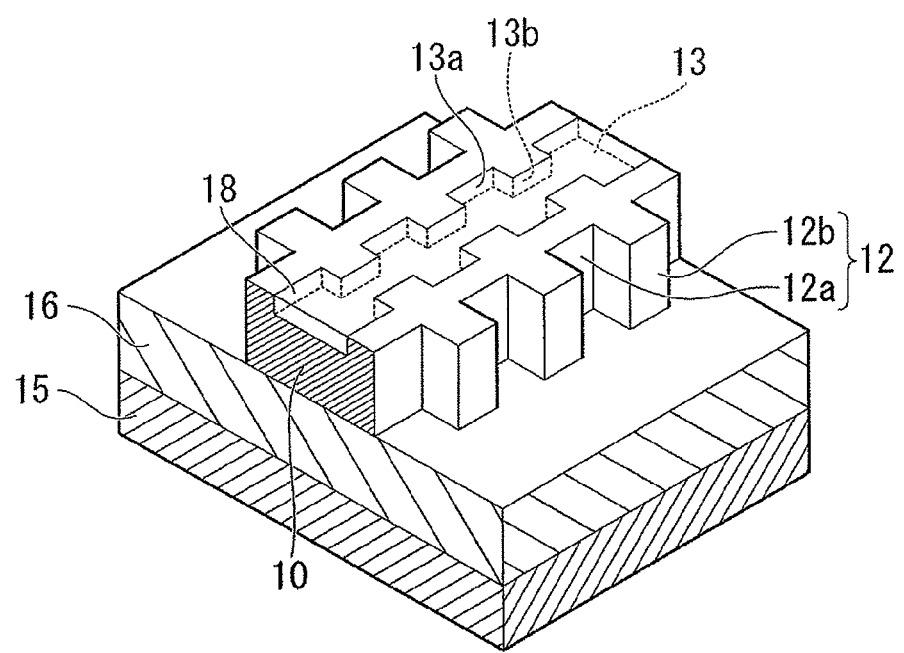
[FIG. 15]

A development step of developing the photoresist layer, an etching step of etching the high refractive index material layer 10b using the photoresist pattern 60 obtained by the development step, and a step of removing the remaining photoresist are sequentially performed after the two-step exposure. As a result, as shown in FIG. 15, it is possible to form the core 10 having the grating structure 12 which has the fin 12b and the valley 12a formed on the sidewall.

In addition, as shown in FIG. 16, the upper cladding 17 (for example, $SiO_2$) is deposited at an appropriate thickness by using the CVD apparatus or the like. The thickness of the deposited upper cladding 17 on the core 10 may sometimes be different from the thickness of the deposited upper cladding 17 on the lower cladding 16. If necessary, the planarization process using chemical mechanical polishing (CMP) and the like may be performed so that the height from the substrate 15 is uniform.

Through the above processes, the planar optical waveguide having the two sets of grating structures on the sidewall of the core and the upper portion of the core can be manufactured. In addition, when using the planar optical waveguide device with a large relative refractive index difference, a converter of the mode field diameter is usually required in optical connection with an optical fiber. In general, the step of forming a region called a mode field converter or a spot size converter is performed before or after the above-described step, such that the converter is integrally formed on the same substrate so as to be optically connected to the optical waveguide.

The phase-shifting photomask used in the first exposure step is a kind of Levenson-type alternative phase-shifting photomask having a structure, in which the pi phase-shifting pattern (180° shifting pattern) and the zero phase-shifting pattern (0° shifting pattern) are alternately provided, as a basic transmission pattern which allows the light (for example, ultraviolet light) used for exposure of the photoresist in the exposure step to be transmitted therethrough.

Figure 30A:
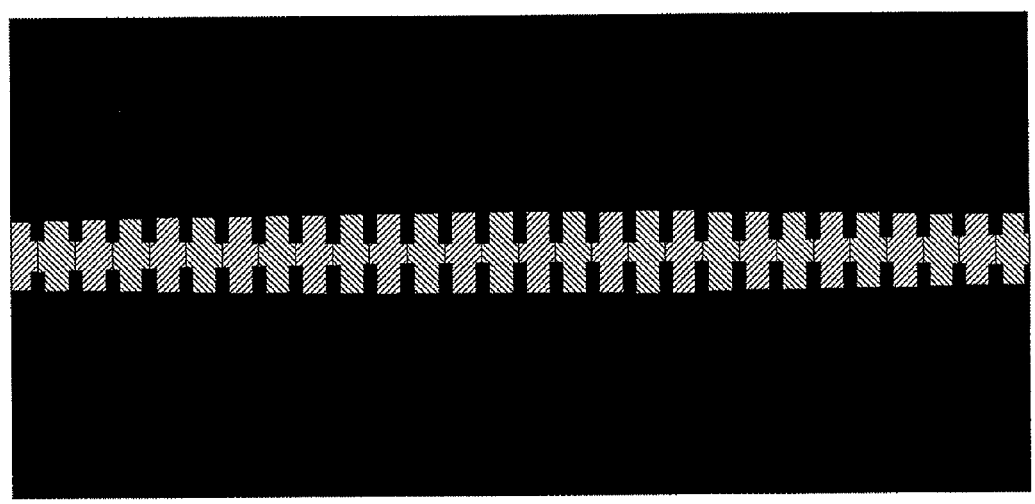
[FIG. 30A]

When using the phase-shifting photomask in the known technique, the chromium pattern corresponding to the desired grating shape is formed as shown in FIG. 30A. However, since the pi phase-shifting pattern and the zero phase-shifting pattern are adjacent to each other, there is a problem in that the precision will be lowered on the tip of the fin or the extension, which will be described later in the second comparative example.

Therefore, in the present invention, the problem is solved by using the phase-shifting photomask and the binary-type photomask in combination as the novel manner described above.

FIRST EXAMPLE

As shown in FIGS. 1A to 1C, the chromatic dispersion compensator of the polarization independent planar optical waveguide in which the core was formed of silicon nitride (SiN) and the cladding was formed of silica glass ($SiO_2$) and which had the grating structure on the sidewall and upper portion of the core of the optical waveguide was designed and manufactured.

The cross-sectional structure of the optical waveguide was designed according to the structure of FIG. 1C, and the correlation of $w_{in}$ and $w_{out}$ with the effective refractive index of the optical waveguide was calculated as shown in FIG. 5.

Then, the grating pattern was designed. The designed center frequency was 188.4 THz. That is, the designed center wavelength was 1591.255 nm. The group delay dispersion and dispersion slope of the single-mode dispersion shifted fiber (DSF) with a length of 100 km which is specified in ITU-T G.653 with a channel interval of 100 GHz in L-Band and over 45 channels in the channel bandwidth of 50 GHz were objects to be compensated. As the optical characteristic of the optical fiber line to be compensated, the group delay dispersion was set to −295 ps/nm and the relative dispersion slope (RDS) was set to 0.018/mm. The intensity of amplitude of reflectance in the channel bandwidth was set to 95%. The reflection spectrum of the complex reflection spectrum r(λ) prepared on the basis of the set values is shown in FIGS. 6 and 7, and the group delay spectrum is shown in FIGS. 8 and 9. The total length of the device was set to 18,000λ and the discretization step at the z position was set to λ/40, and the inverse scattering problem which can acquire said spectrum was solved. As a result, the potential distribution q(z) was calculated. The result is shown in FIGS. 10 and 11.

Then, the potential distribution q(z) was transformed into the effective refractive index distribution $n_{eff}(z)$ by setting the reference refractive index (average effective refractive index) $n_{av}$ which was selected near the middle of the effective refractive index range examined in designing the dimensions of the optical waveguide in FIG. 5, to 1.935 and setting the frequency corresponding to the center wavelength to 188.4 THz (that is, the center wavelength of 1591.255 nm).

The core width of the optical waveguide was determined from the obtained effective refractive index distribution $n_{eff}(z)$ and the relationship between $n_{eff}(z)$ and $w_{out}$ shown in FIG. 5. In addition, the dimensions of the grooved structure was determined from the obtained effective refractive index distribution $n_{eff}(z)$ and the relationship between $n_{eff}(z)$ and $w_{in}$ shown in FIG. 5.

The first phase-shifting photomask shown in FIG. 26 and the second binary-type photomask shown in FIG. 27A were manufactured on the basis of the dimensions of the designed grooved structure. The grooved structure was formed by using these photomasks. The grooved structure was formed by the steps of forming only a part of the upper cladding as the groove section filler 18 and then depositing the high refractive index material for the core of the optical waveguide on both sides of said groove section filler 18.

Accordingly, the portion which becomes the fin of the grating structure when viewed from the core material corresponds to the valley of the groove section filler, and the portion which becomes the valley of the grating structure when viewed from the core material corresponds to the fin of the groove section filler. That is, it needs to be noted that there is an inverse relationship between the line width and the space width. A scanner which uses the exposure light with a wavelength of 248 nm was used.

When the groove section filler obtained in the step of forming the groove section filler was observed with the scanning electron microscope (SEM), it was confirmed that the groove section filler was formed as designed.

In addition, the first phase-shifting photomask shown in FIG. 20 and the second binary-type photomask shown in FIG. 21 were manufactured on the basis of the dimensions (core width) of the designed optical waveguide. The optical waveguide having a sidewall grating structure was manufactured by using these photomasks. A scanner which uses the exposure light with a wavelength of 248 nm was used.

When the obtained optical waveguide was observed with the scanning electron microscope (SEM), it was confirmed that the grating structure was formed on the core sidewall as designed.

FIRST COMPARATIVE EXAMPLE

The same grating structure as in the first example was manufactured by using the usual binary-type photomask. In the first comparative example, a method of depositing the SiN layer serving as the core as much as the thickness of the final core, forming the grooved structure in the photolithography process and the etching step, and then depositing the low refractive index material serving as the upper cladding in order to fill the groove was adopted.

Figure 29:
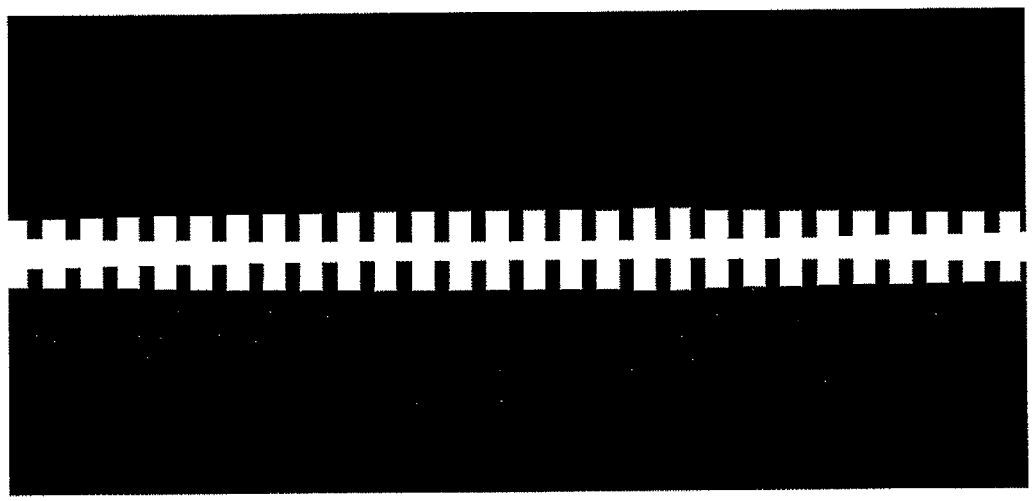
[FIG. 29]

In this case, the chromium pattern of the photomask used to form the grooved structure is shown in FIG. 29. The chromium pattern expressed in black as a reverse pattern in FIG. 29 is a pattern obtained by similarly enlarging the designed grating structure of the grooved structure.

In this case, the minimum line width is 190 nm and the minimum space width is 200 nm in a line and space pattern which can be formed using a scanner which uses exposure light with a wavelength of 248 nm. When sufficient manufacture tolerance is taken into consideration, the grating pitch of 450 nm is required. In this case, it is requested that both the line width and the space width be wider than 220 nm.

However, in the grating structure designed in the first example, the main grating pitch P is 339 nm. Accordingly, the exposure cannot be correctly performed with the usual binary-type photomask. Here, the longitudinal length of the fin of the grating structure corresponds to the line width, and the longitudinal length of the valley corresponds to the space width.

Accordingly, as a result of examining the limitation of the scanner in use, which in this case is a DUV 248 nm tool with numerical aperter limited to 0.68, the grating pitch needs to be at least 400 nm in order for the design to be satisfactorily resolved lithographically without performing further resolution enhancements.

SECOND COMPARATIVE EXAMPLE

The same grating structure as in the first example was manufactured by using the known Levenson-type alternative phase-shifting photomask. In the second comparative example, similar to the first comparative example, a method of depositing the SiN layer serving as the core as much as the thickness of the final core, forming the grooved structure in the photolithography process and the etching step, and then depositing the low refractive index material serving as the upper cladding in order to fill the groove was adopted.

In this case, the structure of a photomask which is used to form the grooved structure is shown in FIG. 30A. The chromium pattern expressed in black as a reverse pattern in FIG. 30A is a pattern obtained by similarly enlarging the designed grating structure of the grooved structure. The transmission pattern without Cr has two kinds of thickness so that the pi phase-shifting pattern and the zero phase-shifting pattern are alternately repeated.

In this case, the minimum line width was 140 nm and the minimum space width was 180 nm in a line and space pattern which could be formed by using the scanner which uses the exposure light with a wavelength of 248 nm. In this case, if the grating pitch is 323 nm or more, it can be resolved.

However, in the photomask structure shown in FIG. 30A, the pi phase-shifting pattern and the zero phase-shifting pattern are adjacent to each other at the position corresponding to the tip of the fin (portion where the lateral groove width narrow) of the grooved grating structure. For this reason, error in the exposure shape and exposure size at the position corresponding to the tip of the fin of the grooved grating structure becomes large. Moreover, on the extension of the fin of the grooved grating structure, an unintended residual line pattern will be formed by phase conflict.

That is, it is difficult to appropriately manufacture the grating structure according to the present invention with the known Levenson-type alternative phase-shifting photomask.

THIRD COMPARATIVE EXAMPLE

Figure 30B:
[FIG. 30B]
Figure 30B:
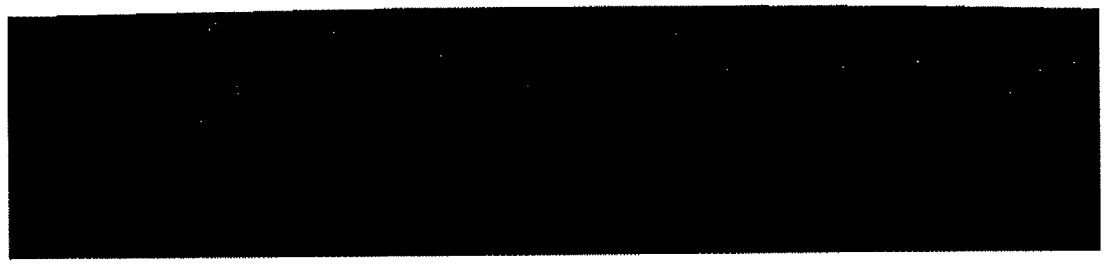

In order to remove the unintended residual line pattern in the second comparative example by trim exposure, the same grating structure as in the first example was manufactured by two-step exposure including the first step using the Levenson-type alternative phase-shifting photomask shown in FIG. 30A and the second step using the binary-type photomask shown in FIG. 30B. In the third comparative example, similar to the second comparative example, a method of depositing the SiN layer serving as the core as much as the thickness of the final core, forming the grooved structure in the photolithography process and the etching step, and then depositing the low refractive index material serving as the upper cladding in order to fill the groove was adopted.

Here, it is assumed that the longitudinal direction (that is, the signal propagating direction) of the optical waveguide is the z direction and the direction (that is, the lateral groove width direction), which is perpendicular to the longitudinal direction and is parallel to the substrate, is the x direction. When the positional deviation between the phase-shifting photomask and the binary-type photomask in the x direction occurs, one of the fin portions which extrude into the groove structure and form a pair with the central axis of the core (and the groove) therebetween is erroneously exposed to be shortened in the second-step exposure. As a result, a problem in that the lateral groove width Wb of one of the fin portions becomes wide occurs. Moreover, in the opposite side of that fin portions, a part of the unintended residual line pattern which should be removed remains.

That is, it is difficult to appropriately manufacture the grating structure of the present invention even if the exposure using the known Levenson-type alternative phase-shifting photomask and the trim exposure are used together.

On the other hand, the grating structure of the present invention can be appropriately manufactured by the first example. The first example is similar to the third comparative example in a point of the two-step exposure including the first step using the Levenson-type alternative phase-shifting photomask and the second step using the binary-type photomask, however, a groove section filler is formed instead of digging the groove structure. In addition, the lateral width in the fin 13b (the lateral width in the valley 18a of the groove section filler) is be set to the design size by using the phase-shifting photomask, and the lateral width in the valley 13a (the lateral width in the fin 18b of the groove section filler) is be set to the design size by using the binary-type photomask. Accordingly, even if two kinds of masks are used in the two exposure steps under conditions in which the exposure position of them deviate from each other in the lateral groove width direction (x direction), the influence on the groove width is small.

Moreover, in the case of the first example, the lateral width of the second shaded portion at the position corresponding to the fin 13b is equal to the lateral width of the second shaded portion at the position corresponding to each of the two valley portions 13a adjacent to the fin 13b, as shown in FIG. 27B. In addition, in the place where the lateral widths of the second shaded portions at the positions corresponding to the two adjacent valley portions 13a are different from each other, the step 51a at which the lateral width of the second shaded portion changes is provided at the position corresponding to the middle of the fin 13b. Accordingly, even if the masks are exposed under conditions in which the exposure position of them deviate from each other in the longitudinal direction (z direction), deviation caused by the second-step exposure does not occur at the tips of the fin portions 18b of the groove section filler (the valley portions 13a) located on the left and right sides toward the signal light propagating direction of the optical waveguide as long as the deviation between the masks is within the half of the longitudinal length of the fin 13b. As a result, it is possible to prevent the unintended residual line pattern from remaining.

<Second Embodiment of the Planar Optical Waveguide Device>

Figure 35:
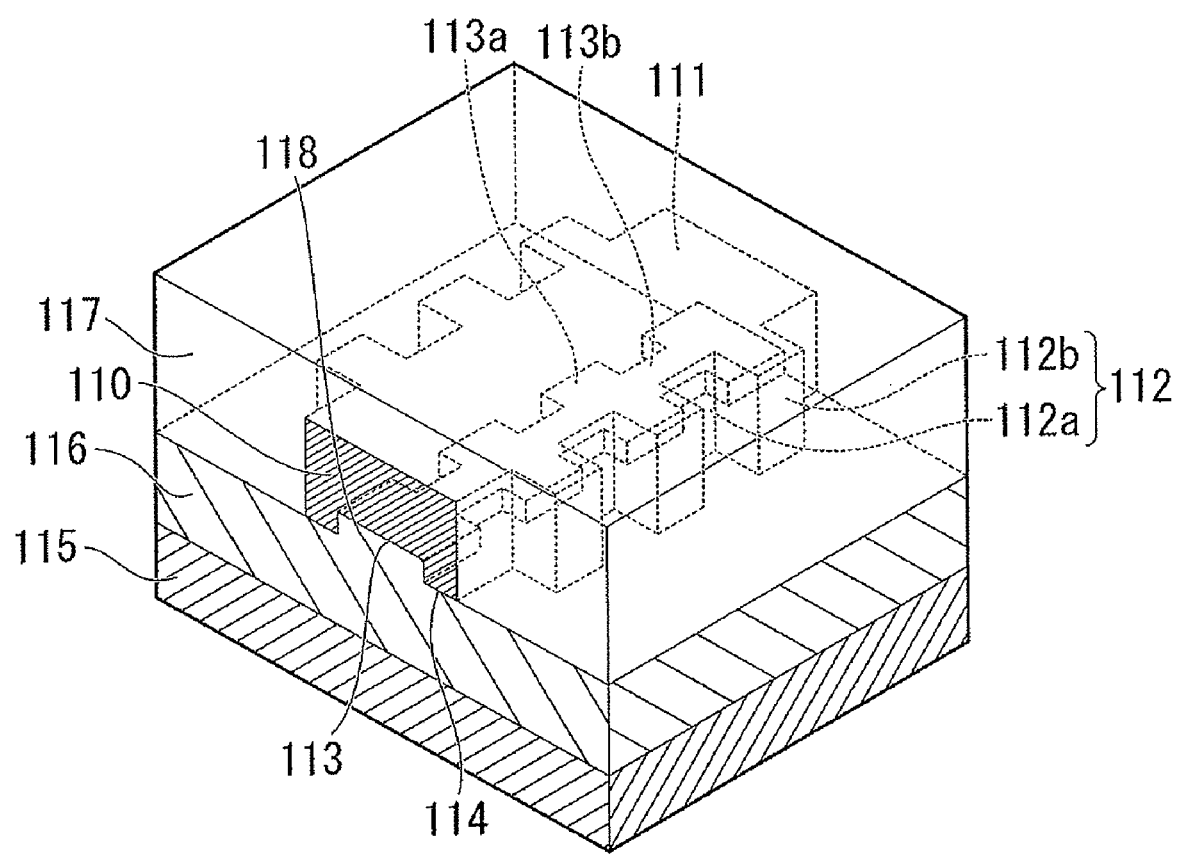
[FIG. 35]

FIG. 35 is a perspective view illustrating a planar optical waveguide device according to a second embodiment of the present invention.

The planar optical waveguide device has a grating structure 112 on a sidewall of an optical waveguide core 110 and a grooved grating structure 113 on a bottom surface 114 of the core 110. A top surface 111 of the core 110 is flat. The optical waveguide has a lower cladding 116 formed on a substrate 115, the core 110 formed on the lower cladding 116, and an upper cladding 117 formed on the core 110 and the lower cladding 116.

In the present embodiment, the same grooved grating structure 13 as the grooved grating structure 113, which is configured to include the fin 13b and the valley 13a in the first embodiment, is formed in a bottom portion of the core 110. The grooved grating structure 113 has a fin (fin portions) 113b and a valley (valley portions) 113a formed on both sides of the groove.

(Manufacturing Method of the Device)

The manufacturing method of the planar optical waveguide device according to the second embodiment is almost the same as the manufacturing method according to the first embodiment except that the order of forming the grooved structure is different.

Figure 31:
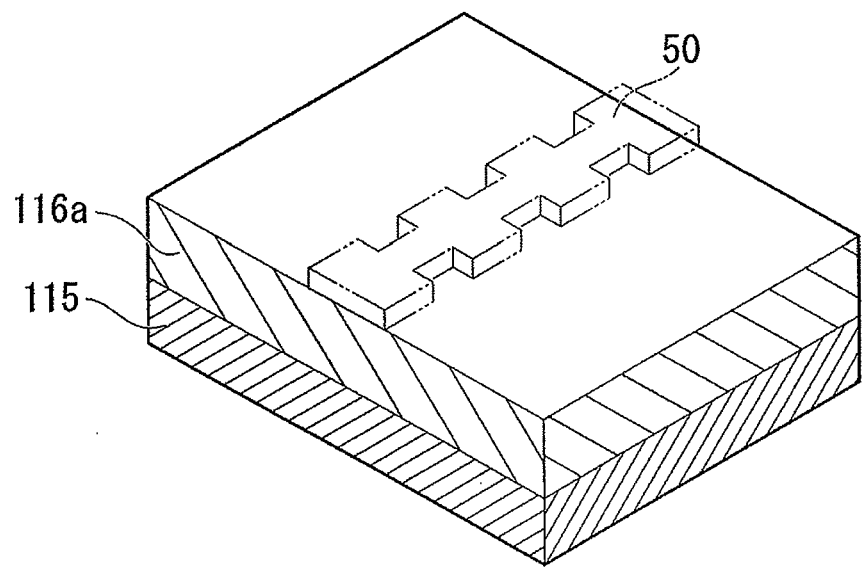
[FIG. 31]

First, as shown in FIG. 31, a low refractive index material layer 116a configured to include the lower cladding 116 and a groove section filler 118 is formed on the support substrate 115 (low refractive index material layer forming step). For example, the support substrate 115 is a silicon wafer, and the low refractive index material layer 116a is an $SiO_2$ layer deposited at an appropriate thickness using the CVD apparatus or the like. Here, the thickness of the low refractive index material layer 116a is a value obtained by adding the depth of the groove of the grooved grating structure 113 to the thickness of the final lower cladding 116.

Then, as shown by the long dashed double-short dashed line in FIG. 31, a photoresist pattern 50 is formed on the low refractive index material layer 116a. The photoresist pattern 50 is for forming the groove section filler 118 (refer to FIG. 32) corresponding to the designed grooved grating structure 113. The pattern of the photomask which is used to form the photoresist pattern 50 is the same as that in the first embodiment.

In the optical waveguide device shown in FIG. 35, the groove section filler 118 serves to fill the inside of the grooved structure 113 and is united with the lower cladding 116. The groove section filler 118 has a valley (valley portions) 118a, which is a portion with a narrow lateral groove width, and a fin (fin portions) 118b, which is a portion with a wide lateral groove width. The groove section filler 118 has a complementary shape for the core 110 around the grooved structure 113. That is, the valley 118a of the groove section filler 118 corresponds to the fin 113b of the grooved structure 113, and the fin 118b of the groove section filler 118 corresponds to the valley 113a of the grooved structure 113.

Figure 32:
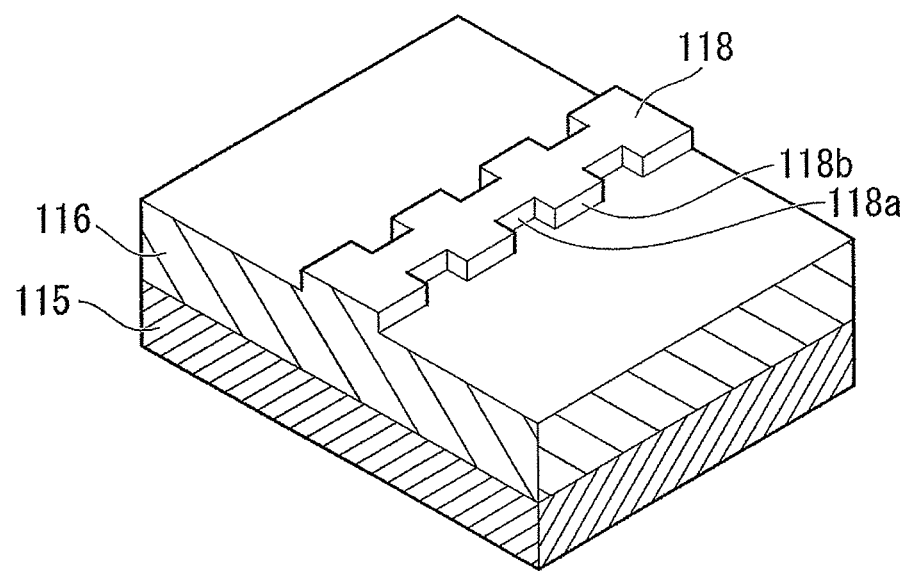
[FIG. 32]

The etching step of etching the low refractive index material layer 116a up to the predetermined depth by using the photoresist pattern 50 obtained by the development step and the step of removing the remaining photoresist are sequentially performed (groove section filler forming step). As a result, as shown in FIG. 32, the groove section filler 118 having the fin 118b and the valley 118a on the sidewall can be formed.

Figure 33:
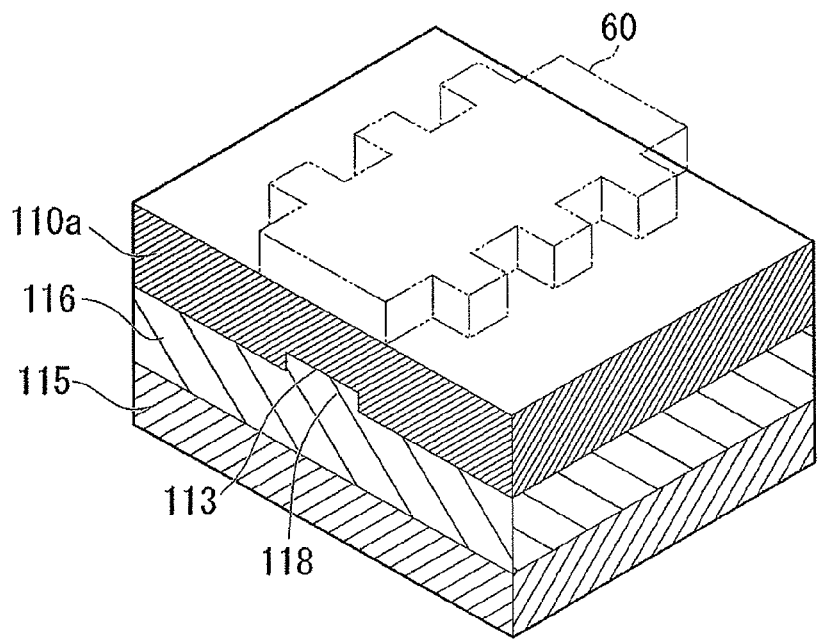
[FIG. 33]

After forming the groove section filler 118, a high refractive index material (for example, SiN) which forms the core 110 is deposited at a desired thickness using the CVD apparatus or the like as shown in FIG. 33 (high refractive index material layer forming step). The thickness of the high refractive index material layer 110a obtained as described above corresponds to the thickness of the final core 110. If necessary, the top surface of the high refractive index material layer 110a may be planarized using chemical mechanical polishing (CMP) and the like so that the height from the substrate 115 is uniform.

Then, as shown by the long dashed double-short dashed line in FIG. 33, a photoresist pattern 60 is formed on the high refractive index material layer 110a. The photoresist pattern 60 corresponds to the designed sidewall grating structure 112. The sidewall grating structure 112 may be formed similarly to the first embodiment.

Figure 34:
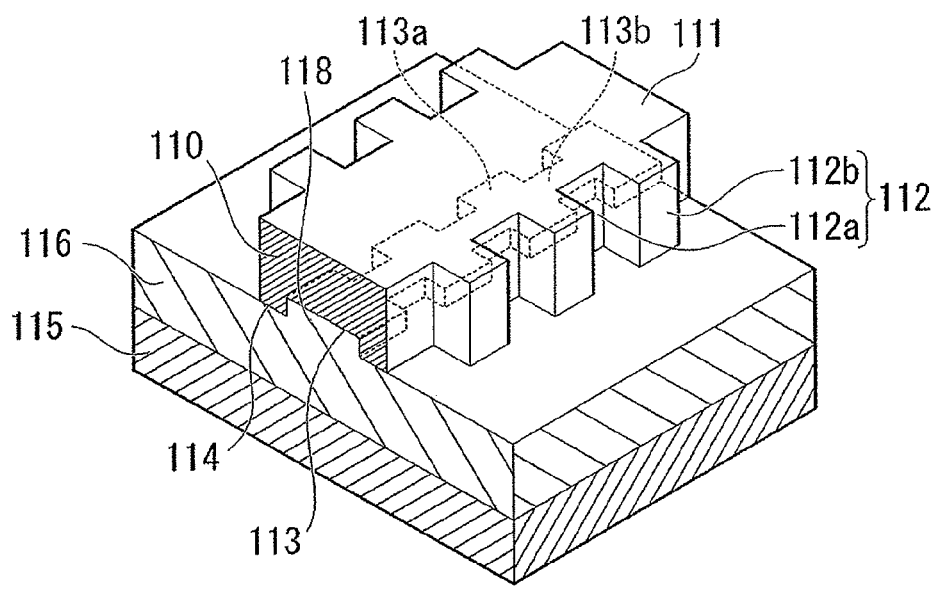
[FIG. 34]

The etching step of etching the high refractive index material layer 110a using the photoresist pattern 60 obtained by the development step and the step of removing the remaining photoresist are sequentially performed. As a result, as shown in FIG. 34, it is possible to form the core 110 having the grating structure 112, which has a fin (fin portions) 112b and a valley (valley portions) 112a formed on the sidewall, and the grooved grating structure 113, which has the fin 113b and the valley 113a formed on the lower portion.

In addition, as shown in FIG. 35, the upper cladding 117 (for example, $SiO_2$) is deposited at an appropriate thickness by using the CVD apparatus or the like. The thickness of the deposited upper cladding 117 on the core 110 may sometimes be different from the thickness of the deposited upper cladding 117 on the lower cladding 116. If necessary, the planarization process using chemical mechanical polishing (CMP) and the like may be performed so that the height from the substrate 115 is uniform.

<Third Embodiment of the Planar Optical Waveguide Device>

Figure 36:
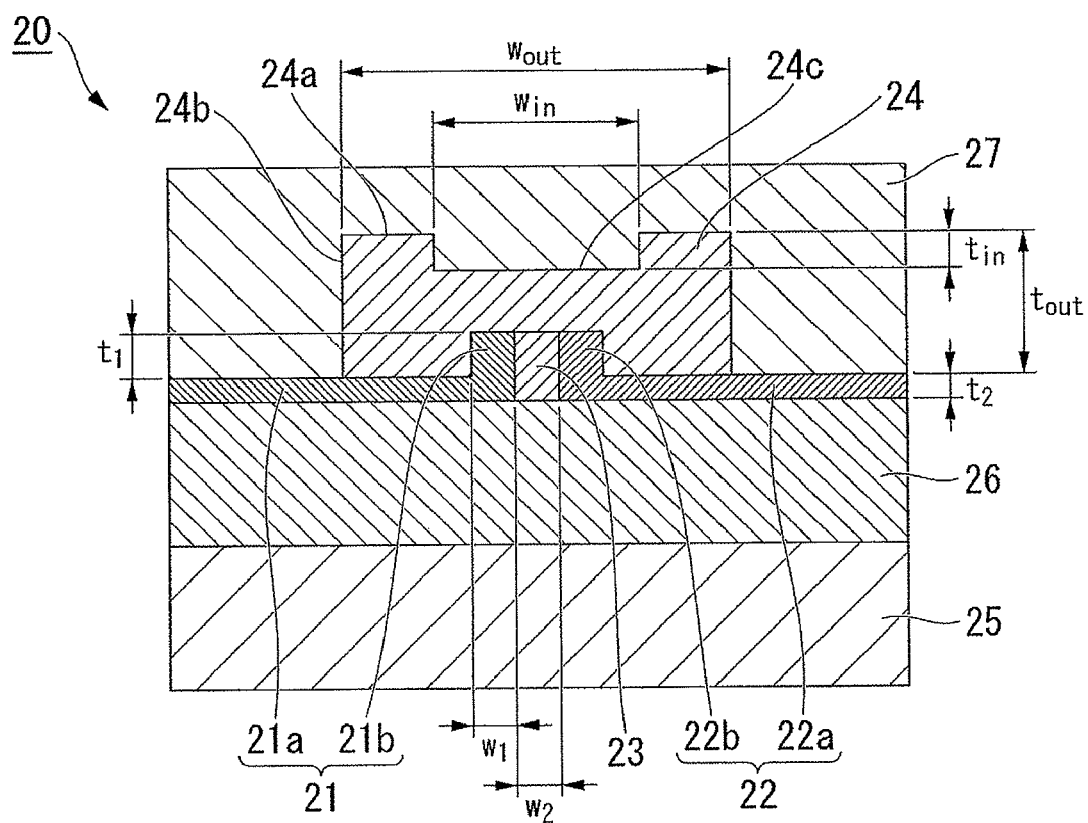
[FIG. 36]

FIG. 36 is a cross-sectional view illustrating a planar optical waveguide device according to a third embodiment of the present invention. The double core structure including inside cores 21 and 22 for changing the optical characteristic and an outside core 24 for solving the problem of polarization dependence of the optical characteristic is adopted for a planar optical waveguide device 20.

This double core structure exists on a lower cladding 26 formed on a substrate 25. The upper portion and both sides of the composite core are covered with an upper cladding 27. The upper cladding 27 and the lower cladding 26 are formed of materials with refractive indices which are lower than the average refractive index of the double core structure. The material of the lower cladding 26 and the material of the upper cladding 27 may be the same or different.

The inside cores 21 and 22 are divided into two portions with a central gap 23 interposed therebetween. The inside core 21 has a rib 21b and a slab 21a, and the inside core 22 has a rib 22b and a slab 22a.

The outside core 24 is disposed on the inside cores 21 and 22. The refractive index of the outside core 24 is lower than the average refractive index of the inside cores 21 and 22. Although not shown in FIG. 36, the same sidewall grating structure and upper grooved grating structure as those of the core 10 shown in FIGS. 1A to 1C are formed on a sidewall 24b of the outside core 24 and a grooved structure 24c of a top surface 24a, respectively. Specifically, there are provided the sidewall grating structure in which the core width $w_{out}$ of the outside core 24 changes periodically and the upper grooved grating structure in which the lateral width $w_{in}$ of the grooved structure 24c formed on the top surface 24a of the outside core 24 changes periodically.

The manufacturing method of the optical waveguide device 20 according to the present embodiment is the same as the manufacturing method of the optical waveguide device according to the first embodiment except that the inside cores 21 and 22 and the central gap 23 are formed between the lower cladding 26 and the outside core 24.

Firstly, an $SiO_2$ layer serving as the lower cladding 26 and a thin-film silicon layer serving as the inside cores 21 and 22 are formed on a silicon wafer serving as the support substrate 25. This process may be substituted by preparing a commercially available SOI (Silicon on Insulator) wafer which has an $SiO_2$ layer, such as a thermal oxidation film, called a BOX layer on a silicon wafer and a thin-film silicon layer formed on the $SiO_2$ layer.

Silicon of the SOI layer is appropriately patterned by the photolithographic process and etching step, and a P-type semiconductor region and an N-type semiconductor region are formed by the process of implanting an impurity dopant. The impurities (dopant) which give the conductivity to the high refractive index core formed of a semiconductor material may be suitably selected according to a base material. For example, when the base material is a group IV semiconductor material such as silicon, group III elements such as boron (B) are used as additives which give the P-type conductivity, and group V elements such as phosphorus (P) or arsenic (As) are used as additives which give the N-type conductivity.

In addition, the isolation nanogap structure for reducing the leakage current may be provided by partially forming a fine groove in the silicon of the SOI layer and depositing $SiO_2$. The variable optical characteristic function may be realized by applying the voltage from the outside to the inside cores 21 and 22 so that the refractive index changes are caused by the carrier plasma effect. If necessary, the central gap 23 is formed as the isolation nanogap structure first. Then, the shapes of the silicon ribs 21b and 22b and silicon slabs 21a and 22a of the inside cores 21 and 22 are processed by the photolithographic process and etching step.

After forming the inside cores 21 and 22, the outside core 24 is formed. In the first embodiment described above, the first high refractive index material layer 10a in FIG. 12 is formed on the lower cladding 16. In contrast, in the present embodiment, the high refractive index material layer which forms the outside core 24 is formed on the inside cores 21 and 22. Thereafter, the outside core 24 having the sidewall grating structure and the upper grooved grating structure can be formed by the same processes as those shown in FIGS. 12 to 15. In addition, $SiO_2$ for forming the upper cladding 27 is deposited on the upper portion and both sides of the outside core 24. In addition, metal connections and electrode pads for applying the voltage to the inside cores 21 and 22 is formed when necessary.

The optical waveguide device manufactured by the manufacturing method according to the present invention is characterized in that each pitch $P_G$ satisfies $(P_G-P)/\Delta P = N$ over the entire grating structure. Here, P is a predetermined pitch reference value, $\Delta P$ is a value obtained by dividing P by M, M is a predetermined integer value larger than 1, and N is an integer.

Figure 39:
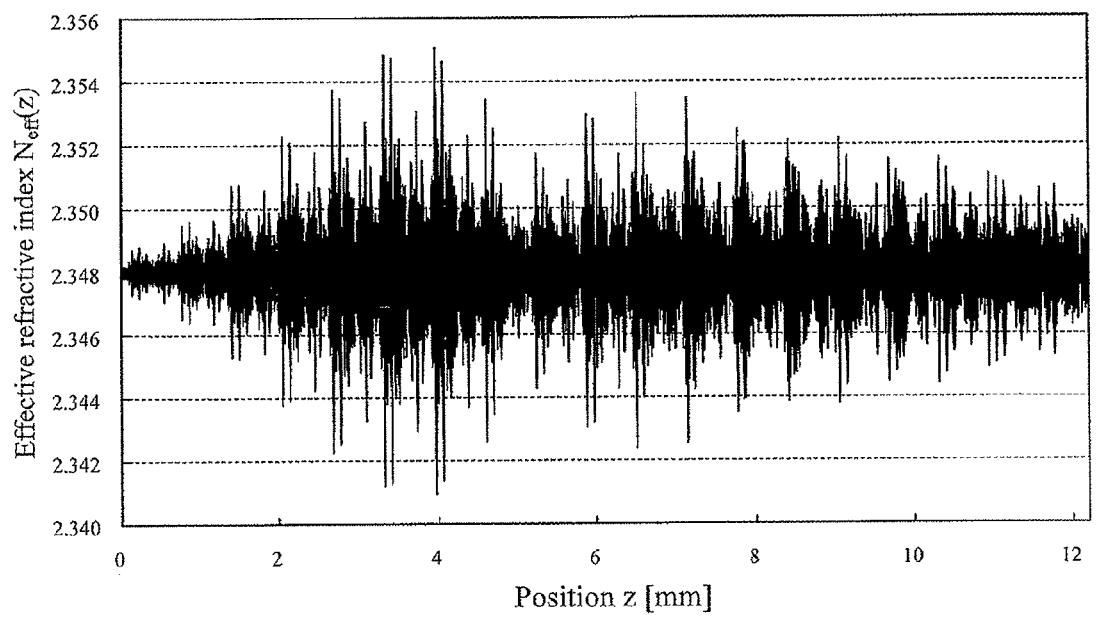
[FIG. 39]
Figure 40:
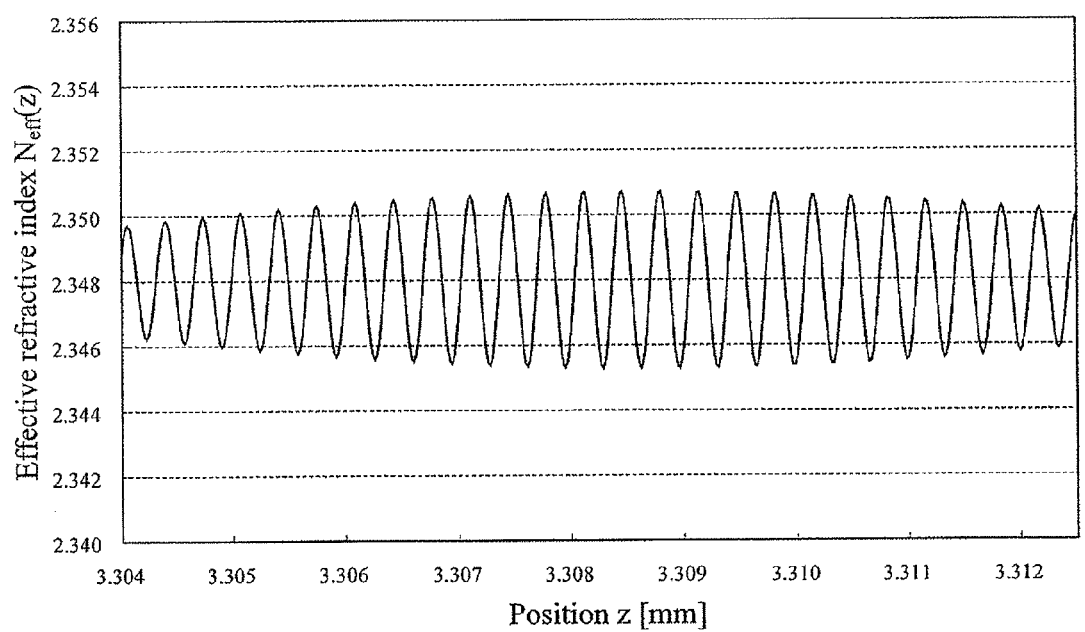
[FIG. 40]

As one specific example thereof, the results obtained by transforming the potential distribution q(z) shown in FIGS. 10 and 11 into the effective refractive index distribution $n_{eff}(z)$ based on the structure in a second example, which will be described later, are shown in FIGS. 39 and 40. FIG. 39 is an overall view corresponding to the total length of about 12.2 mm of the optical waveguide device, and FIG. 40 is an enlarged view near 3.308 mm thereof.

The effective refractive index distribution $n_{eff}(z)$ shown in FIGS. 39 and 40 was integrated (averaged) to realize a simplified grating structure where the fin portions, in which the fixed amplitude continues, and the valley portions, in which the fixed amplitude continues, are alternately repeated with a steep (stepwise) change. The distribution of the grating pitch obtained as described above is shown in FIGS. 41 and 42.

Figure 41:
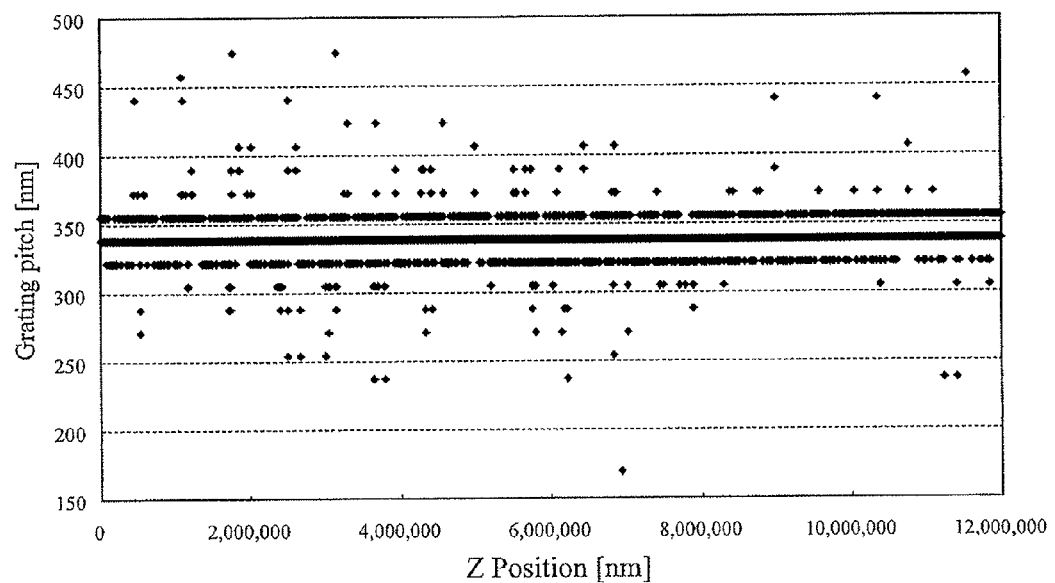
[FIG. 41]
Figure 42:
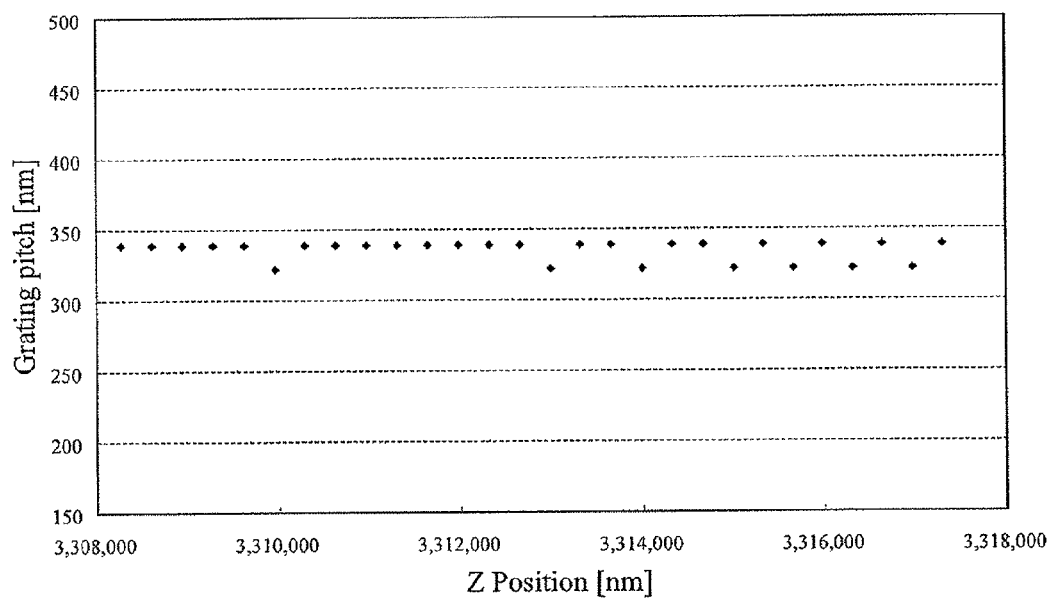
[FIG. 42]

As shown in FIGS. 41 and 42, the grating structure of the present invention is characterized in that the dimensions (core width and groove width) of the optical waveguide in the fin and the valley are non-uniform and the grating pitch takes the predetermined limited discrete values.

FIGS. 41 and 42 show an example of the distribution of the grating pitch of a chromatic dispersion compensator with the device length of about 12.2 mm and the grating period of about 36,000. This is the case where the dimensions of the optical waveguide, which is designed for L-Band by setting the reference refractive index (average effective refractive index) $n_{av}$ to 2.348 and setting the center wavelength λc to about 1591 nm, is calculated. The main grating pitch P is $P=λc/(n_{av}\times 2)=339$ nm.

Since the discretization step of the z position when solving the inverse scattering problem to calculate the potential distribution q(z) is set to λ/40, M is 20 and ΔP=P/M=17 nm. In FIG. 41, the existence of the grating pitches 169 nm, 237 nm, 254 nm, 271 nm, 288 nm, 305 nm, 322 nm, 339 nm, 356 nm, 373 nm, 390 nm, 407 nm, 424 nm, 441 nm, 457 nm, and 474 nm corresponding to P−10ΔP, P−6ΔP, P−5ΔP, P−4ΔP, P−3ΔP, P−2ΔP, P−ΔP, P, P+ΔP, P+2ΔP, P+3ΔP, P+4ΔP, P+5ΔP, P+6ΔP, P+7ΔP, and P+8ΔP is confirmed. Grating pitches equal to or less than P−11ΔP and equal to or more than P+9ΔP and the grating pitches 186 nm, 203 nm, and 220 nm corresponding to P−9ΔP, P−8ΔP, and P−7ΔP do not exist.

In FIG. 42, the enlargement of the range between 3.308 mm and 3.318 mm is shown from the total length of about 12.2 mm shown in FIG. 41 is shown. This range corresponds to the range shown in FIGS. 17 to 20, 21, 23 to 26, and 27A, in which parts of patterns of the above-described four photomasks are shown. In this region, most of the pitches are 339 nm corresponding to P, and some pitches are 322 nm corresponding to P−ΔP.

Note that, in general design examples, P is the highest in frequency and the next is P±ΔP. The three kinds are main pitches and there is a tendency in which the frequency of appearance of the corresponding grating pitch decreases as the integral value N of P±NΔP increases. Although not shown in this specification, for example, in design examples of the single channel optical filter, there is also a case where almost all grating pitches are P, only several P±ΔP are observed, and P±NΔP (where, N is 2 or more) does not appear. In addition, in the second example, the pitches of P−9ΔP, P−8ΔP, and P−7ΔP did not appear. Moreover, in design examples of another chromatic dispersion compensator, there is a case where P is not observed at all and two kinds of pitches of P±ΔP appear as the main pitches evenly.

Thus, it is effective in maintaining the processing accuracy in the CMOS manufacturing process when the pitches are determined from a small limited number of discrete values. In the CMOS manufacturing process, measuring the dimensions by using the scanning electron microscope (SEM) as in DICD (Development Inspection Critical Dimension) or FICD (Final Inspection Critical Dimension) is a general process control technique. Accordingly, in the structure having a gradually changing pitch like the chirped-pitch gratings, it is difficult to control the pitch accuracy. On the other hand, in the structure having pitches in a small number of discrete values like the present invention, or in the structure having only one pitch like uniform-pitch gratings, the process control is easier.

SECOND EXAMPLE

The chromatic dispersion compensator of the planar optical waveguide which had the structure shown in FIG. 36 and in which the inside core was formed of silicon (Si), the outside core was formed of silicon nitride (SiN), and the cladding was formed of silica glass ($SiO_2$) was designed and manufactured.

Figure 37A:
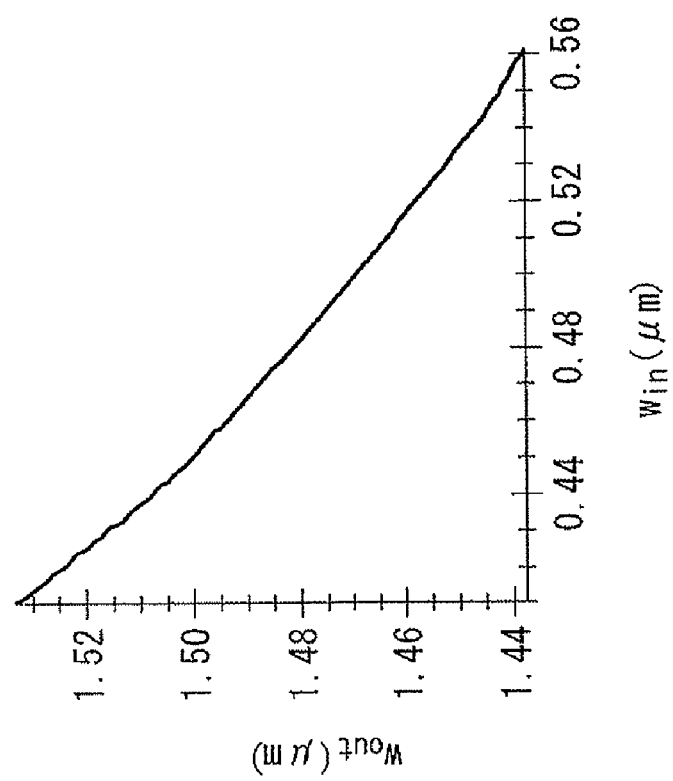
[FIG. 37A]
Figure 37B:
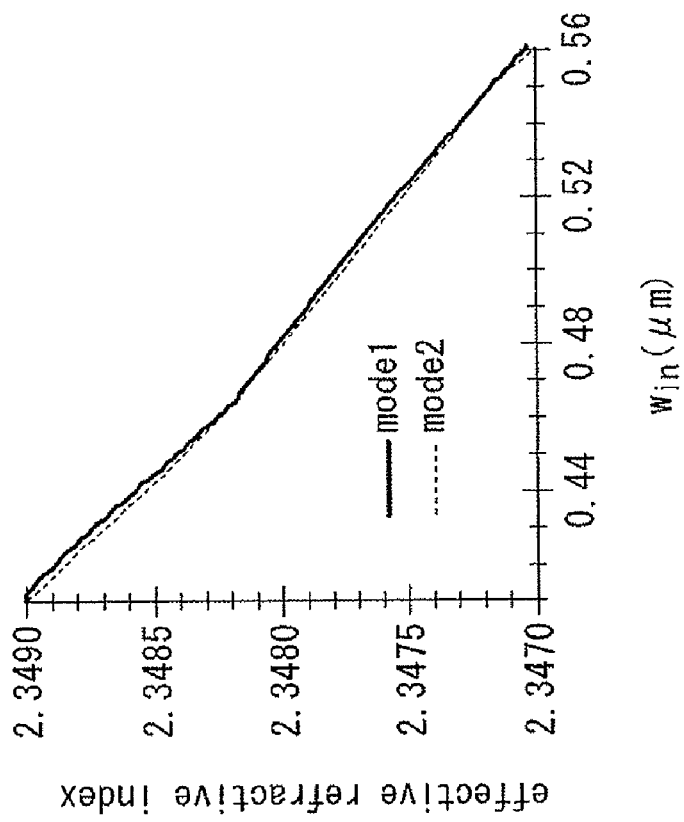
[FIG. 37B]
Figure 38:
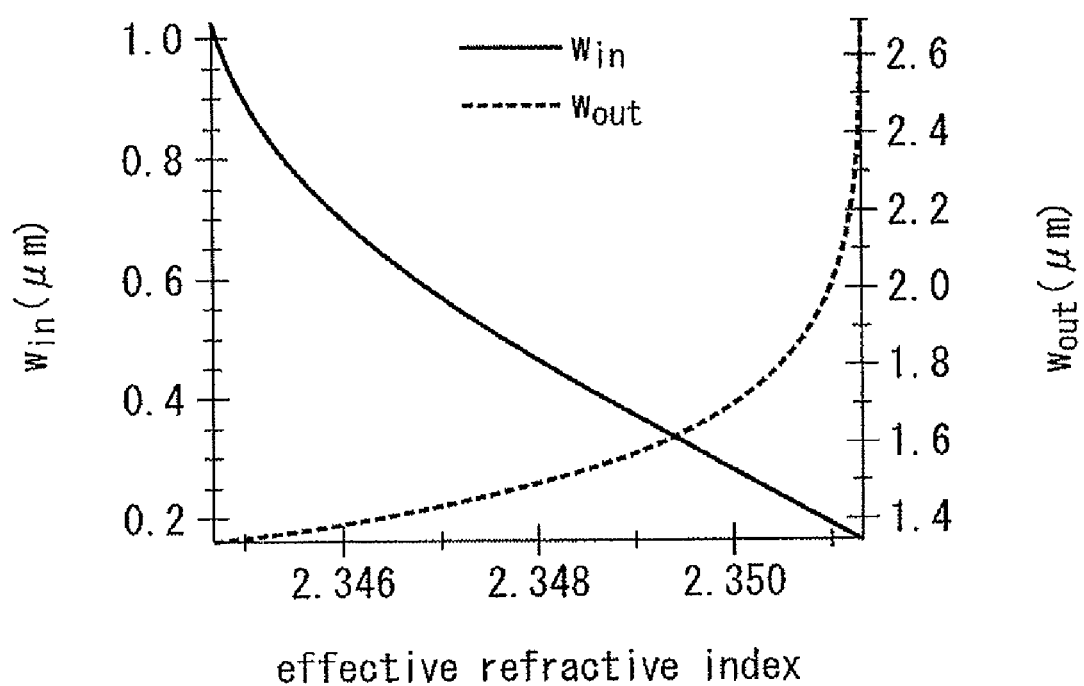
[FIG. 38]

The cross-sectional structure of the optical waveguide was designed according to the structure of FIG. 36 and the $w_{in}$ dependence of the effective refractive index in the TE polarization (mode 1) and the TM polarization (mode 2) shown in FIG. 37A, the relationship between $w_{in}$ and $w_{out}$ shown in FIG. 37B, and the correlation of $w_{in}$ and $w_{out}$ with the effective refractive index of the optical waveguide shown in FIG. 38 were calculated.

When designing the optical waveguide structure, the material and dimensions of each portion adopted are as follows. The inside cores 21 and 22 were formed of silicon (Si), the central gap 23 was formed of silica glass ($SiO_2$), the outside core 24 was formed of silicon nitride (SiN), the substrate 25 was formed of silicon (Si), the lower cladding 26 was formed of silica glass ($SiO_2$), and the upper cladding 27 was formed of silica glass ($SiO_2$). In addition, for the dimensions of each portion, $t_1=250$ nm, $t_2=50$ nm, $w_1=280$ nm, $w_2=160$ nm, $t_{out}=600$ nm, $t_{in}=100$ nm, the thickness of the lower cladding 26 was 2000 nm, and the maximum thickness (thickness on the slabs 21a and 22a) of the upper cladding 27 was 2000 nm.

Design of the grating pattern is the same as that in the first example up to the design process of calculating the potential distribution q(z). Then, the reference refractive index (average effective refractive index) $n_{av}$, which was selected near the middle of the effective refractive index range $n_{eff}$ shown on the horizontal axis of FIG. 38, was set to 2.348. Moreover, as a device for L-Band, the frequency corresponding to the center wavelength was set to 188.4 THz (that is, the center wavelength of 1591.255 nm) and the potential distribution q(z) shown in FIGS. 10 and 11 was transformed into the effective refractive index distribution $n_{eff}(z)$ shown in FIGS. 39 and 40.

The core width of the optical waveguide was determined from the obtained effective refractive index distribution $n_{eff}(z)$ and the relationship between $n_{eff}(z)$ and $w_{out}$ shown in FIG. 38. In addition, the dimensions of the grooved structure was determined from the obtained effective refractive index distribution $n_{eff}(z)$ and the relationship between $n_{eff}(z)$ and $w_{in}$ shown in FIG. 38.

The first phase-shifting photomask shown in FIG. 26 and the second binary-type photomask shown in FIG. 27A were manufactured on the basis of the dimensions of the designed grooved structure, and the grooved structure was formed by using these photomasks. The grooved structure was formed by the steps of forming only a part of the upper cladding as the groove section filler and then depositing the high refractive index material for the core of the optical waveguide on both the sides of said groove section filler.

Figure 43:
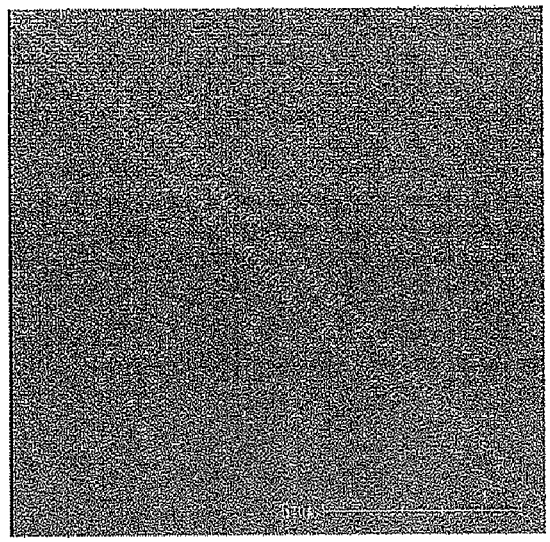
[FIG. 43]
Figure 44:
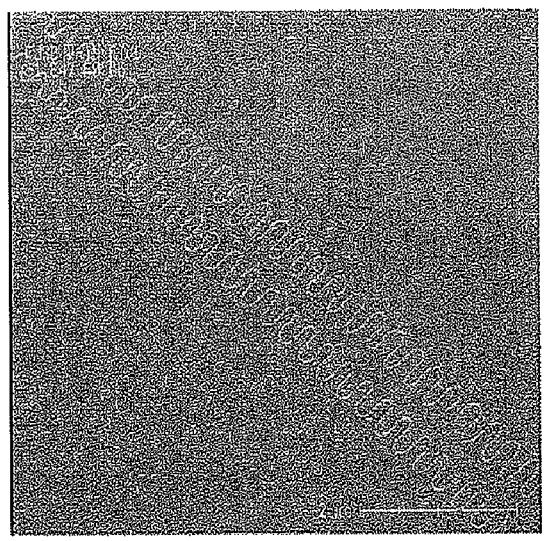
[FIG. 44]

When the groove section filler obtained in the stop of forming the groove section filler was observed with the scanning electron microscope (SEM), it was confirmed that the groove section filler formed of $SiO_2$ had a complementary structure for the grooved grating structure that was designed, as shown in FIGS. 43 and 44.

In addition, the first phase-shifting photomask shown in FIG. 20 and the second binary-type photomask shown in FIG. 21 were manufactured on the basis of the dimensions (core width) of the designed optical waveguide. The optical waveguide having a sidewall grating structure was manufactured by using these photomasks. A scanner which uses the exposure light with a wavelength of 248 nm was used.

Figure 45:
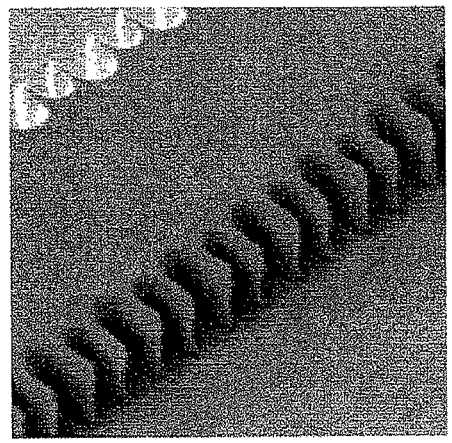
[FIG. 45]
Figure 46:
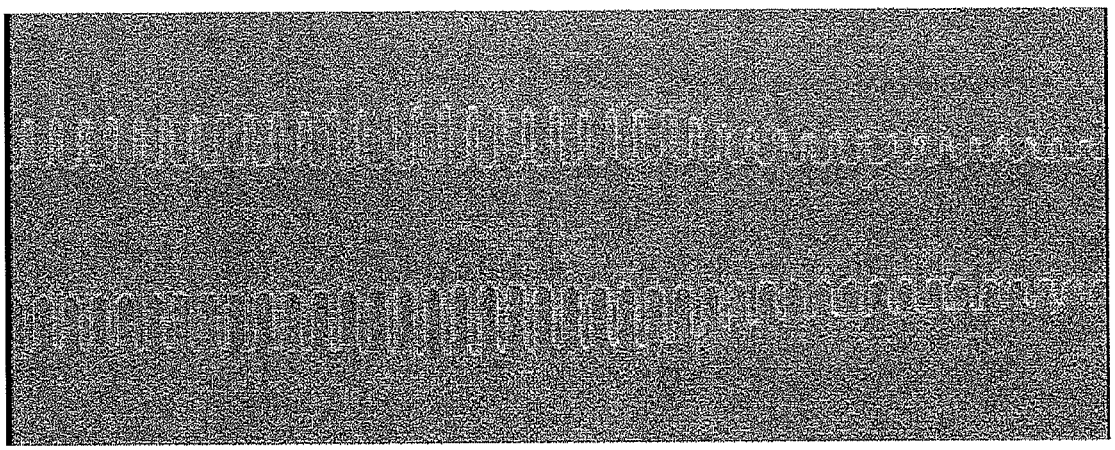
[FIG. 46]
Figure 47:
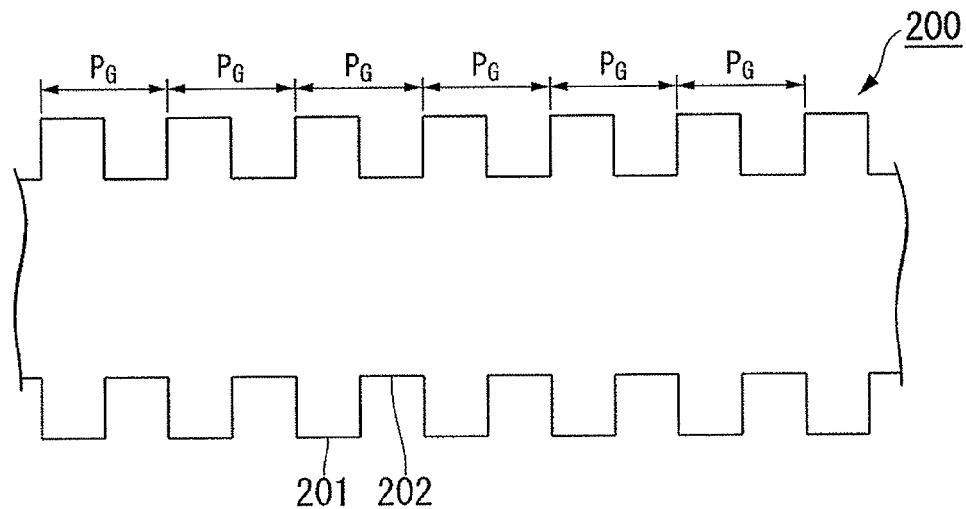
[FIG. 47]
Figure 48:
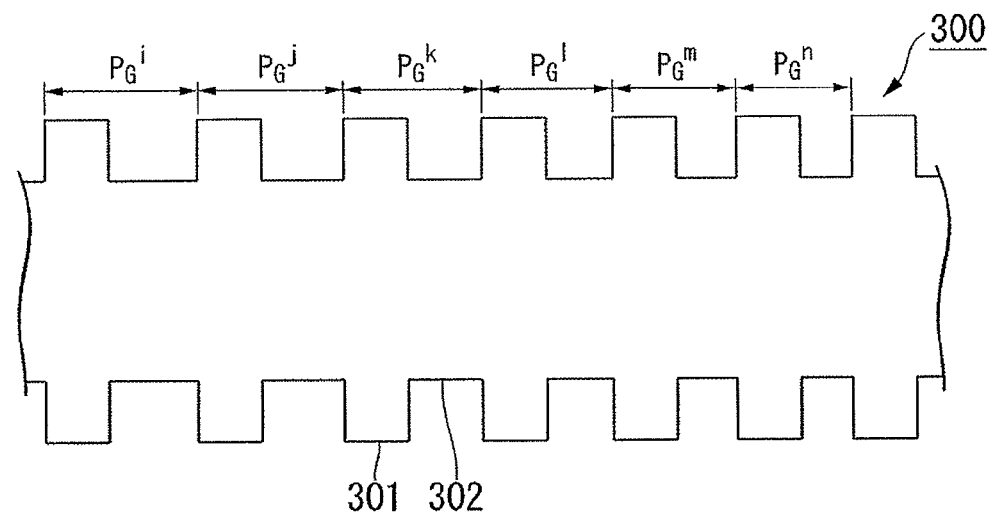
[FIG. 48]

When the obtained optical waveguide was observed with the scanning electron microscope (SEM), it was confirmed that the sidewall grating structure was formed on the outside core, which was formed of SiN, as designed as shown in FIGS. 45 and 46.

INDUSTRIAL APPLICABILITY

According to the present invention, it is possible to provide a manufacturing method for a planar optical waveguide device which can be made small by reducing the length while realizing a high functionality and which has a grating structure in which the processing accuracy can be easily controlled in the manufacturing process.

REFERENCE SIGNS LIST

- 10, 110: core
- 10a, 10b, 110a: high refractive index material layer
- 11, 111: top surface
- 12, 112: sidewall grating structure
- 12a, 112a: valley (valley portions)
- 12b, 112b: fin (fin portions)
- 13, 113: grooved grating structure (grooved structure)
- 13a, 113a: valley (valley portions)
- 13b, 113b: fin (fin portions)
- 14, 114: bottom surface
- 15, 25, 115: substrate (support substrate)
- 16, 26, 116: lower cladding
- 17, 27, 117: upper cladding
- 17a, 116a: low refractive index material layer
- 18, 118: groove section filler
- 18a, 118a: valley (valley portions)
- 18b, 118b: fin (fin portions)
- 20: planar optical waveguide device
- 21, 22: inside core
- 21a, 22a: slab
- 21b, 22b: rib
- 23: central gap
- 24: outside core
- 24a: top surface
- 24b: sidewall
- 24c: grooved structure
- 50: photoresist pattern for groove section filler
- 60: photoresist pattern for sidewall

The invention claimed is:

1. A method for manufacturing a planar optical waveguide device including a core of which a top face is provided with a groove section along a longitudinal direction of the core, the groove section being filled with a groove section filler made of a low refractive index material having a refractive index lower than a refractive index of the core, the method comprising;
   - a first high refractive index material layer forming step of forming a high refractive index material layer made of a high refractive index material which constitutes a lower part of the core;
   - a low refractive index material layer forming step of forming a low refractive index material layer made of the low refractive index material on said high refractive index material layer;
   - a groove section filler forming step of forming the groove section filler by trimming both lateral portions of the low refractive index material layer by means of photolithography and etching; and
   - a second high refractive index material layer forming step of forming a high refractive index material layer made of a high refractive index material which constitutes an upper part of the core so as to fill both sides of the lateral portions of said groove section filler.

2. A method for manufacturing a planar optical waveguide device including a core of which a bottom face is provided with a groove section along a longitudinal direction of the core, the groove section being filled with a groove section filler made of a low refractive index material having a refractive index lower than a refractive index of the core, the method comprising;
   - a low refractive index material layer forming step of forming a low refractive index material layer made of a low refractive index material;
   - a groove section filler forming step of forming the groove section filler by trimming both lateral portions of the low refractive index material layer by means of photolithography and etching; and
   - a high refractive index material layer forming step of forming a high refractive index material layer made of a high refractive index material which constitutes the core so as to fill both sides of the lateral portions of said groove section filler and cover a top face of said groove section filler.

3. The method for manufacturing a planar optical waveguide device according to claim 1 or 2, wherein the groove section includes a plurality of alternatively arranged fin portions and valley portions along a longitudinal direction of the core to form a grating structure, in which the shapes of the material which constitute said core are a fin shape and the lateral widths of said groove section filler are narrow at respective fin portions and the shapes of the material which constitute said core are a valley shape and the lateral widths of said groove section filler are wide at respective valley portions.

4. The method for manufacturing a planar optical waveguide device according to claim 3, wherein the lateral widths of said groove section filler at the fin portions and the lateral widths of said groove section filler at the valley portions vary.

5. The method for manufacturing a planar optical waveguide device according to claim 3, wherein pitches, which are each defined as a sum of a longitudinal length of one of the fin portions and a longitudinal length of one of the valley portions adjacent to said one of the fin portions along a longitudinal direction of the core, vary and are non-chirped.

6. The method for manufacturing a planar optical waveguide device according to claim 5, wherein each of the pitches ($P_G$) over the entirety of the grating structure satisfies ($P_G$−P)/$\Delta$P=N, where P is a predetermined reference value of the pitches, $\Delta$P is P divided by M, M is an integer greater than one, and N is an integer.

7. The method for manufacturing a planar optical waveguide device according to claim 6, wherein said N for major pitches of the grating structure are +1, −1, or 0.

8. The method for manufacturing a planar optical waveguide device according to claim 3, wherein lateral widths of the groove section filler of the fin portions, lateral width of the groove section filler of the valley portions and pitches, which are each defined as a sum of a longitudinal length of one of the fin portions and a longitudinal length of one of the valley portions adjacent to said one of the fin portions along a longitudinal direction of the core, are set to values obtained by solving the inverse scattering problem to which predetermined optical characteristics are input.

9. The method for manufacturing a planar optical waveguide device according to claim 8, wherein the inverse scattering problem is solved using Zakharov-Shabat's equation.

10. The method for manufacturing a planar optical waveguide device according to claim 3, wherein the groove section filler forming step further comprises:
- a photoresist layer forming step of forming a photoresist layer on said low refractive index material layer,
- a first exposure step of forming shaded portions on said photoresist layer using a first photomask, said first photomask being a phase-shifting photomask and the lateral widths of said shaded portion at positions corresponding to the fin portions are substantially equal to the respective widths of said groove section filler of the fin portions and lateral widths at positions corresponding to the valley portions are wider than the respective lateral widths of said groove section filler of the valley portions and exposing said photoresist layer at the outside of said shaded portions;
- a second exposure step of forming shaded portions on said photoresist layer using a second photomask, said second photomask being a binary photomask and the lateral widths of said shaded portions at positions corresponding to the fin portions are wider than the respective lateral widths of said groove section filler of the fin portions and the lateral widths of said shaded portions at positions corresponding to the valley portions are substantially equal to the respective lateral widths of said groove section filler of the valley portions;
- a development step of developing the photoresist layer; and
- an etching step of etching the low refractive index material layer using the photoresist pattern resulted from said development step to form said groove section filler.

\* \* \* \* \*